United States Patent
Imai et al.

(10) Patent No.: US 9,324,302 B2
(45) Date of Patent: *Apr. 26, 2016

(54) STORAGE MEDIUM HAVING STORED THEREON DISPLAY CONTROL PROGRAM AND DISPLAY CONTROL APPARATUS

(71) Applicants: Daiji Imai, Kyoto (JP); Ryoichiro Atono, Kai (JP)

(72) Inventors: Daiji Imai, Kyoto (JP); Ryoichiro Atono, Kai (JP)

(73) Assignees: Nintendo Co., Ltd., Kyoto (JP); Hal Laboratory, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,109

(22) Filed: Feb. 15, 2013

(65) Prior Publication Data
US 2013/0176343 A1 Jul. 11, 2013

Related U.S. Application Data

(63) Continuation of application No. 12/078,010, filed on Mar. 26, 2008, now Pat. No. 9,117,408.

(30) Foreign Application Priority Data

Jan. 25, 2008 (JP) ................................ 2008-014940

(51) Int. Cl.
G09G 5/34 (2006.01)
G06F 3/0485 (2013.01)
G06F 3/14 (2006.01)
(Continued)

(52) U.S. Cl.
CPC ............... *G09G 5/34* (2013.01); *G06F 3/0485* (2013.01); *G06F 3/14* (2013.01); *G09G 5/373* (2013.01); *G09G 5/14* (2013.01); *G09G 5/40* (2013.01);
(Continued)

(58) Field of Classification Search
None
See application file for complete search history.

(56) References Cited

U.S. PATENT DOCUMENTS 6,462,784 B1 * 10/2002 Kohno et al. ................. 348/563
7,051,280 B1 * 5/2006 Ko .............................. 715/718
(Continued)

FOREIGN PATENT DOCUMENTS

JP 2001-521324 11/2001
JP 2002-320166 10/2002
(Continued)

OTHER PUBLICATIONS

Internet TV Guide, [online], Tokyo News Service, Ltd., Dec. 2007, <URL: www.tvguide.or.jp/>.

*Primary Examiner* — Ming Hon
*Assistant Examiner* — Khoa Vu
(74) *Attorney, Agent, or Firm* — Nixon & Vanderhye, P.C.

(57) ABSTRACT

In accordance with an operation content indicated by a user's operation data, an amount of scrolling is calculated, and a display range of a table to be displayed on a display apparatus is moved in the table in accordance with the amount of the scrolling. With respect to respective drawing areas, whether or not drawing start points, from which drawing character strings are to be drawn, stay within the display range is determined. When the drawing start point of a drawing area, among the drawing areas, falls outside the display range, the drawing start point of the drawing area is changed to a position which is in the drawing area and also which stays within the display range. The character strings are arranged in the respective drawing areas from the drawing start points set to the respective drawing areas, and the table in the display range is displayed on the display apparatus together with the arranged character strings.

17 Claims, 26 Drawing Sheets

(51) Int. Cl.
    *G09G 5/373*    (2006.01)
    *G09G 5/14*    (2006.01)
    *G09G 5/40*    (2006.01)
    *H04N 21/482*    (2011.01)

(52) U.S. Cl.
    CPC ............... *G09G 2340/0471* (2013.01); *G09G 2340/0478* (2013.01); *H04N 21/482* (2013.01)

(56) References Cited

U.S. PATENT DOCUMENTS

| | | | |
|---|---|---|---|
| 7,712,116 B2* | 5/2010 | Kunieda et al. | 725/40 |
| 2003/0105809 A1* | 6/2003 | Yoshii et al. | 709/203 |
| 2005/0193337 A1* | 9/2005 | Noguchi et al. | 715/542 |
| 2005/0251825 A1* | 11/2005 | Fukuda et al. | 725/44 |
| 2006/0066754 A1* | 3/2006 | Zaima | 348/564 |
| 2008/0040752 A1* | 2/2008 | Kawana | 725/58 |
| 2008/0060007 A1* | 3/2008 | Matsubayashi et al. | 725/39 |
| 2008/0098429 A1* | 4/2008 | Urabe et al. | 725/39 |
| 2010/0146546 A1* | 6/2010 | Nishimura et al. | 725/39 |
| 2013/0162662 A1* | 6/2013 | Miyazaki | 345/522 |

FOREIGN PATENT DOCUMENTS

| | | |
|---|---|---|
| JP | 2005-260316 A | 9/2005 |
| JP | 2006-203535 | 8/2006 |
| WO | WO 99/21308 | 4/1999 |

\* cited by examiner

F I G. 1 4
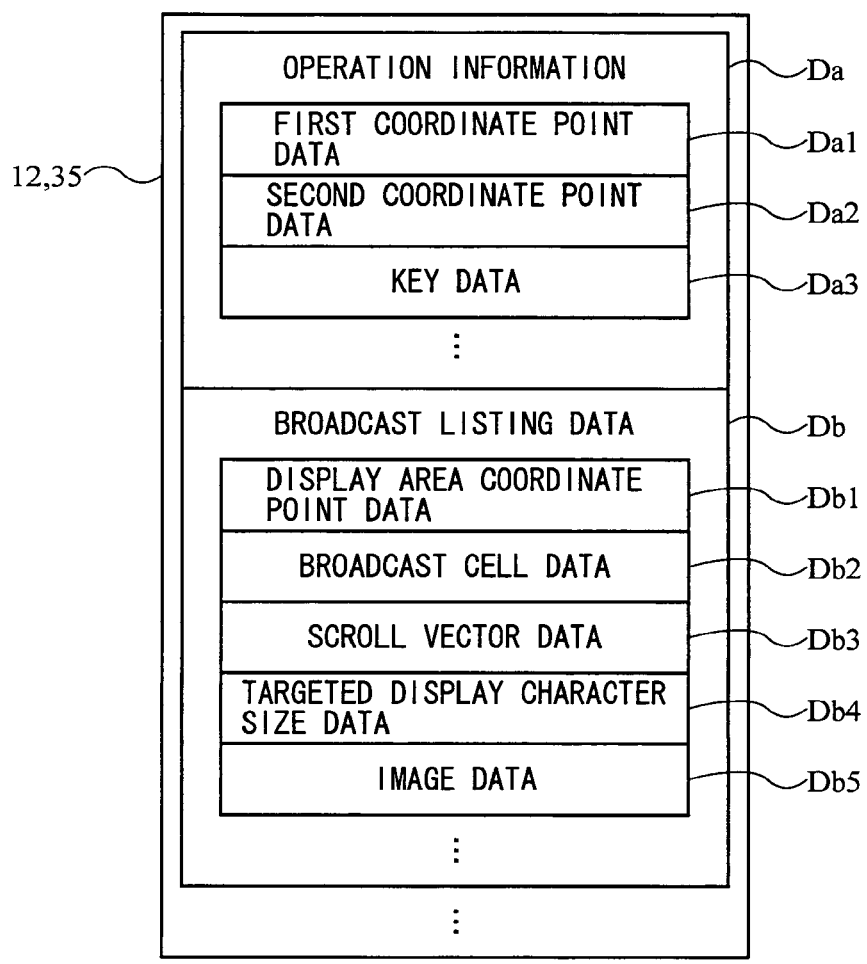

FIG. 15

| BROADCAST CELL DATA | | | Db2 |
|---|---|---|---|
| BROADCAST CELL NUMBER | 1 | | Db2a |
| BROADCAST TITLE CHARACTER STRING DATA | A B C D E F G H | | Db2b |
| NUMBER OF BROADCAST TITLE CHARACTERS DATA | 8 | | Db2c |
| TELEVISION STATION DATA | A | | Db2d |
| BROADCAST CELL COORDINATE POINT DATA | LEFT TOP CORNER COORDINATE POINT (xsa,ysa) RIGHT BOTTOM CORNER COORDINATE POINT (xsb,ysb) | | Db2e |
| DRAWING AREA WIDTH DATA | dw | | Db2f |
| DRAWING AREA HEIGHT DATA | dh | | Db2g |
| DRAWING CHARACTER SIZE DATA | SMALL | | Db2h |
| DRAWABLE NUMBER OF LINES DATA | 2 | | Db2i |
| DRAWABLE NUMBER OF CHARACTERS DATA | 4 | | Db2j |
| DRAWING START POINT DATA | (xsc,ysc) | | Db2k |
| BROADCAST CELL NUMBER | 2 | | |
| ⋮ | ⋮ | | |

F I G. 2 0
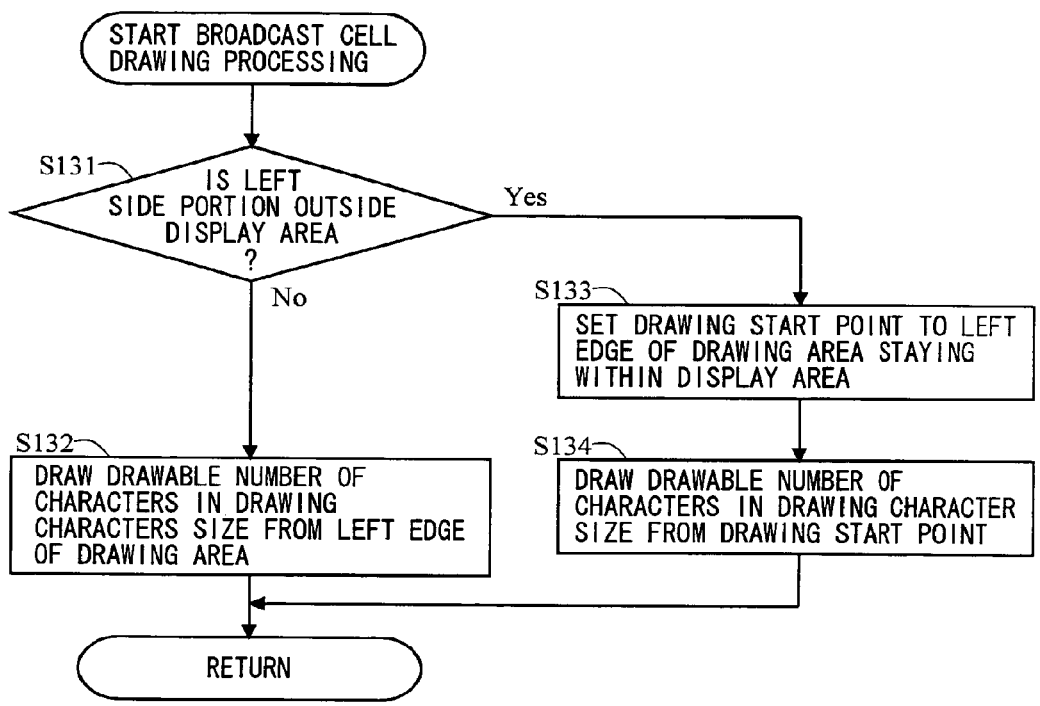

STORAGE MEDIUM HAVING STORED THEREON DISPLAY CONTROL PROGRAM AND DISPLAY CONTROL APPARATUS

CROSS REFERENCE TO RELATED APPLICATION

This application is a continuation of U.S. patent application Ser. No. 12/078,010, filed Mar. 26, 2008, which claims priority to Japanese Patent Application No. 2008-014940, filed on Jan. 25, 2008, the entire contents of each of which are incorporated herein by reference.

BACKGROUND OF THE INVENTION

1. Field of the Invention

The present invention relates to a storage medium having stored thereon a display control program and a display control apparatus. More specifically, the present invention relates to a storage medium having stored thereon a display control program and display control apparatus which cause character strings to be displayed in a plurality of drawing areas.

2. Description of the Background Art

Conventionally, in the case where a large amount of information such as images and characters is displayed on a screen, and the whole of the information cannot be displayed on the screen of a display device, the displayed information is scrolled, whereby a content displayed within the screen is changed. For example, information such as an electronic broadcast listing is displayed such that a plurality of broadcast cells is arranged in a matrix form along a time axis and a broadcast station axis. As a method for scrolling and displaying such electronic broadcast listing, Japanese Laid-Open Patent Publication No. 2002-320166 (hereinafter referred to as Patent document 1), for example, discloses a display method in which one hourly time frame along the time axis is set as a unit of scrolling, and the electronic broadcast listing is moved or switched from page to page. Further, in the case of an electronic broadcast listing displayed on a web browser such as the Internet Explorer, (e.g., "Internet TV Guide", [online], Tokyo News Service, Ltd. [searched on Dec. 18, 2007], Internet <URL:www.tvguide.or.jp/> (hereinafter referred to as Non-patent document 1)), known is an electronic broadcast listing whose display range changes in accordance with a scroll operation such as pointing performed by a user.

However, in the display method disclosed in above-described Patent document 1, in the case where a portion of broadcast cell information in the electronic broadcast listing falls outside the display screen as a result of the page-to-page movement or switching in the electronic broadcast listing, nothing is described relating to how to control such display. Further, in the case of the electronic broadcast listing described in above-described Non-patent document 1, when a portion of broadcast cell information in the electronic broadcast listing falls outside the display area, only a remaining portion of the broadcast cell information which stays within the display area is displayed in the display area. Therefore, it becomes difficult for the user to correctly understand a content of the broadcast cell information, the portion of which falls outside the display area, and in addition, viewability deteriorates in this case.

SUMMARY OF THE INVENTION

Therefore, an object of the present invention is to provide a storage medium having stored thereon a display control program and a display control apparatus which allows a user to easily understand information at the time of a scroll operation and which improves viewability of display information.

The present invention has the following features to attain the object mentioned above. The reference numerals, step numbers (denoted by S, which is short for step, and numbers), drawing numbers and the like in the parentheses indicate the correspondence with the embodiment described below in order to aid in understanding the present invention and are not intended to limit, in any way, the scope of the present invention.

A first aspect of the present invention is directed to a computer-readable storage medium having stored thereon a display control program executed by a computer (10) of an apparatus (5) for drawing predetermined character strings in a plurality of drawing areas and arranging and displaying (FIGS. 9 to 12) the plurality of drawing areas in the form of a table. The display control program causes the computer to function as operation data acquisition means (CPU executing step 53; hereinafter simply denoted by step numbers), scroll amount calculation means (S55), display range moving means (S56), drawing start point determination means (S131), drawing start point changing means (S133), character string arranging means (S132, S134), and display control means (S132, S134). The operation data acquisition means acquires operation data (Da) of a user. The scroll amount calculation means calculates an amount of scrolling (scv) in accordance with an operation content indicated by the operation data. The display range moving means causes a display range of the table displayed on a display apparatus (2) to be moved in the table in accordance with the amount of the scrolling (FIG. 24). The drawing start point determination means determines whether or not a drawing start point for drawing each of the character strings in each of the drawing areas stays within the display range. The drawing start point changing means changes, in the case where the drawing start point determination means determines that the drawing start point of a drawing area, among the drawing areas, falls outside the display range, the drawing start point of the drawing area to a position which is in the drawing area and also which stays within the display range (xsc, ysc). The character string arranging means arranges each of the character strings into each of the drawing areas from the drawing start point which is set to each of the drawing areas. The display control means causes the table within the display range to be displayed on the display apparatus together with the character strings arranged by the character string arranging means.

In a second aspect based on the first aspect, with respect to a drawing area, among the drawing areas, where a portion of the drawing area stays within the display range, and a remaining portion of the drawing area falls outside the display range, the drawing start point determination means determines whether or not the drawing start point of the drawing area stays within the display range.

In a third aspect based on the first aspect, the display range moving means causes the display range to be moved, in accordance with the amount of scrolling, by a distance (va) shorter than a length of the drawing area in a scrolling direction at an interval of a unit time. The drawing start point determination means determines whether or not the drawing start point stays within the display range each time the display range moving means causes the display range to be moved.

In a fourth aspect based on the first aspect, the scroll amount calculation means calculates a scroll speed (va), which indicates an amount of scrolling per unit time, at an interval of the unit time, in accordance with the operation content indicated by the operation data. The display range moving means causes the display range to be moved in the table at the interval of the unit time in accordance with the scroll speed.

In a fifth aspect based on the first aspect, the computer is further caused to function as drawing area expanding/reducing means (S57), character size determination means (S98 to S101), and character size changing means (S97, S102). In the case where a portion of a drawing area, among the drawing areas, stays within the display range and a remaining portion of the drawing area falls outside the display range, the drawing area expanding/reducing means expands/reduces the drawing area so as to limit the drawing area to the portion thereof which stays within the display range. The character size determination means determines, in the case where the drawing area expanding/reducing means expands/reduces the drawing area, whether or not a character size of a character string to be drawn in the drawing area is changed. The character size changing means changes the character size to be drawn in the drawing area in the case where the character size determination means determines to change the character size to be drawn in the drawing area. The character string arranging means arranges the character string in the drawing area from the drawing start point of the drawing area in the character size to be drawn in the drawing area, the character size having been changed by the character size changing means.

In a sixth aspect based on the fifth aspect, the character size determination means includes number-of-characters calculation means (S98) and number-of-characters determination means (S99 to S100). The number-of-characters calculation means calculates the number of characters arrangeable in the drawing area in accordance with a size of the drawing area. The number-of-characters determination means determines whether or not the character size of the character string to be drawn in the drawing area is to be changed in accordance with whether or not the number of characters arrangeable in the drawing area calculated by the number-of-characters calculation means is equal to or more than a predetermined number (three characters). The character size changing means changes the character size to a relatively larger size in the case where the number of characters arrangeable in the drawing area is determined, by the number-of-characters determination means, to be equal to or more than the predetermined number, whereas changes the character size to a relatively smaller size in the case where the number of characters arrangeable in the drawing area is determined by the number-of-characters determination means, to be less than the predetermined number.

In a seventh aspect based on the sixth aspect, in the case where the number of characters arrangeable in the drawing area is determined, by the number-of-characters determination means, to be less than the predetermined number, the character size changing means reduces the character size to be arranged in the drawing area by one level (S102). When the character size changing means reduces the character size, the number-of-characters determination means recalculates the number of characters arrangeable in the drawing area in accordance with the size of the drawing area with respect to which the character size has been reduced and in accordance with the reduced character size. In accordance with the reduced character size reduced by the character size changing means, the number-of-characters determination means determines whether or not the number of characters recalculated by the number-of-characters calculation means is equal to or more than the predetermined number.

In an eighth aspect based on the seventh aspect, in the case where the number-of-characters determination means determines that the number of characters arrangeable in the drawing area is less than the predetermined number under a circumstance where the character size changing means has reduced the character size to a minimum size, the character string arranging means leaves the drawing area blank (S104).

In a ninth aspect based on the sixth aspect, the number-of-characters calculation means includes number-of-lines calculation means (S113) and number-of-characters-per-line calculation means (S118 to S120). The number-of-lines calculation means calculates the number of character lines arrangeable in the drawing area in accordance with a length of one side of the drawing area and in accordance with a length of a character in a direction of the one side, the character having a character size to be arranged in the drawing area. The number-of-characters-per-line calculation means calculates the number of characters arrangeable in each of the character lines in the drawing area in accordance with a length of the other side of the drawing area and in accordance with a length of the character in a direction of the other side, the character having the character size to be arranged in the drawing area. The number-of-characters calculation means calculates the number of characters arrangeable in the drawing area by using the number of character lines and the number of characters arrangeable in each of the character lines. The character string arranging means arranges the character string in the drawing area from the drawing start point of the drawing area in accordance with the character size having been changed, with respect to the drawing area, by the character size changing means and by using the number of character lines.

In a tenth aspect based on the first aspect, the table is a broadcast listing in which the plurality of drawing areas is arranged in a matrix form, and in which one axis thereof represents a time axis and the other axis represents a broadcast station axis. The character string arranging means arranges each of the character strings at least indicative of a broadcast title into each of the plurality of the drawing areas in accordance with a broadcast station and a broadcast time of the broadcast.

An eleventh aspect is directed to a display control apparatus for drawing predetermined character strings in a plurality of drawing areas and for arranging and displaying the plurality of drawing areas in the form of a table. The display control apparatus comprises operation data acquisition means, scroll amount calculation means, display range moving means, drawing start point determination means, drawing start point changing means, character string arranging means, and display control means. The operation data acquisition means acquires operation data of a user. The scroll amount calculation means calculates an amount of scrolling in accordance with an operation content indicated by the operation data. The display range moving means causes a display range of the table displayed on a display apparatus to be moved on the table in accordance with the amount of scrolling. The drawing start point determination means determines whether or not a drawing start point for drawing each of the character strings in each of the drawing areas stays within the display range. The drawing start point changing means changes, in the case where the drawing start point determination means determines that the drawing start point of a drawing area, among the drawing areas, falls outside the display range, the drawing start point of the drawing area to a position which is in the drawing area and also which stays within the display range. The character string arranging means arranges each of the character strings into each of the drawing areas from the drawing start point which is set to each of the drawing areas. The display control means causes the table within the display range to be displayed on the display apparatus together with the character strings arranged by the character string arranging means.

According to the first aspect, it is possible to understand information easily at the time of a scroll operation and also possible to improve viewability of the display information. For example, when a drawing start point of a drawing area falls outside the display range due to the scroll operation, the drawing start point is changed to a position in the drawing area staying in the display range, whereby character string information in respective drawing areas can be understood easily even when the scroll operation is performed, and viewability of a table can be improved.

According to the second aspect, drawing start point determination processing is performed only with respect to such drawing areas that are located around an outer edge of the display range, and thus a fewer number of drawing areas are subject to the processing, which makes the processing easier.

According to the third and fourth aspects, scrolling can be performed smoothly in units smaller than a unit of the drawing area, and understandability and viewability of the display information at the time of the scroll operation can be improved.

According to the fifth aspect, when a portion of the drawing area falls outside the display range due to the scroll operation, a character size of a character string displayed on the drawing area can be changed appropriately.

According to the sixth aspect, when a predetermined number or more of characters cannot be drawn in the drawing area due to a change in a size of the drawing area, the character string is drawn in a relatively smaller character size, whereas when the predetermined number or more of the characters can be drawn therein, the character string is drawn in a relatively larger character size. Accordingly, the character string can be displayed as large a character size as possible, and a decrease in the drawable number of characters can be avoided. Therefore, understandability and viewability of the information can be maintained.

According to the seventh aspect, when the predetermined number or more of the characters cannot be drawn due to the change in the size of the drawing area, the character size is reduced to a character size in which the predetermined number or more of the characters can be drawn. Therefore, the decrease in the drawable number of characters can be avoided, and information composed of the predetermined number or more of characters can be continuously drawn in the drawing area.

According to the eighth aspect, in the case where only less than the predetermined number of characters can be arranged in the drawing area even if a minimum character size is applied, the drawing area is displayed in blank. Therefore, it is possible to avoid a messy display and deterioration in the viewability, which are caused by displaying insufficient information on the drawing area.

According to the ninth aspect, it is possible to calculate the number of characters drawable in each of the drawing areas efficiently by using simple processing. Further, the character string can be drawn by using a plurality of lines in the drawing area, and thus the character string composed of the predetermined number or more of characters can be arranged efficiently when the drawing area is reduced by the scroll operation.

According to the tenth aspect, it is possible to improve the viewability of the broadcast information described on the broadcast listing in accordance with the scroll operation performed by the user, and also possible to enhance operability to improve the viewability of the broadcast information.

According to the display control apparatus of the present invention, a similar effect as the above-described storage medium having stored thereon the display control program can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing exemplary major data stored in a main memory of the game apparatus body 5;

FIG. 15 is a diagram showing, in detail, an exemplary content of broadcast cell data Db2 shown in FIG. 14;

FIG. 20 is a sub-routine showing, in detail, an operation of broadcast cell drawing processing in step 103 shown in FIG. 18;

DESCRIPTION OF THE PREFERRED EMBODIMENTS

Figure 1:
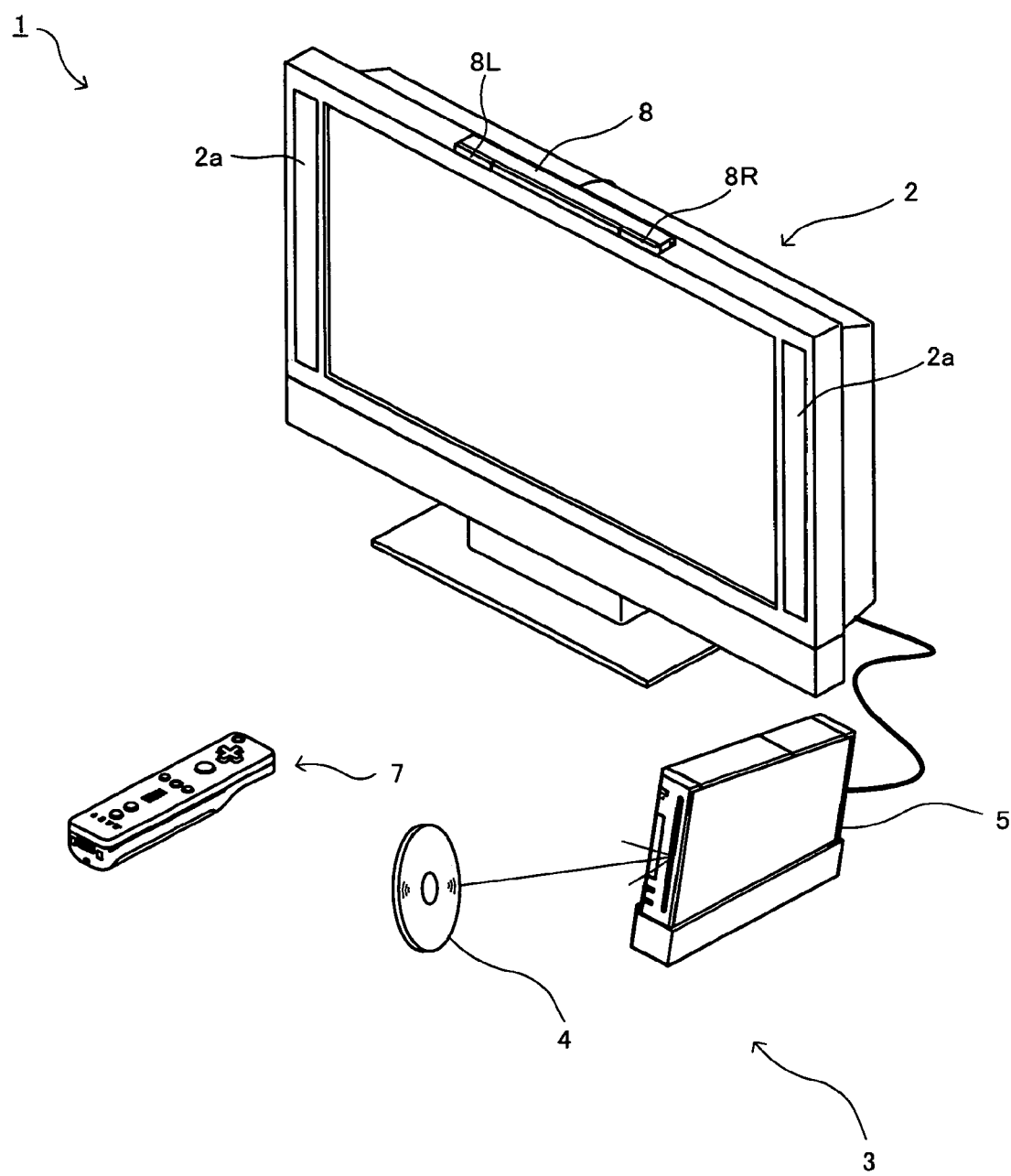
FIG. 1 is an external view illustrating a game system according to one embodiment of the present invention.
Figure 2:
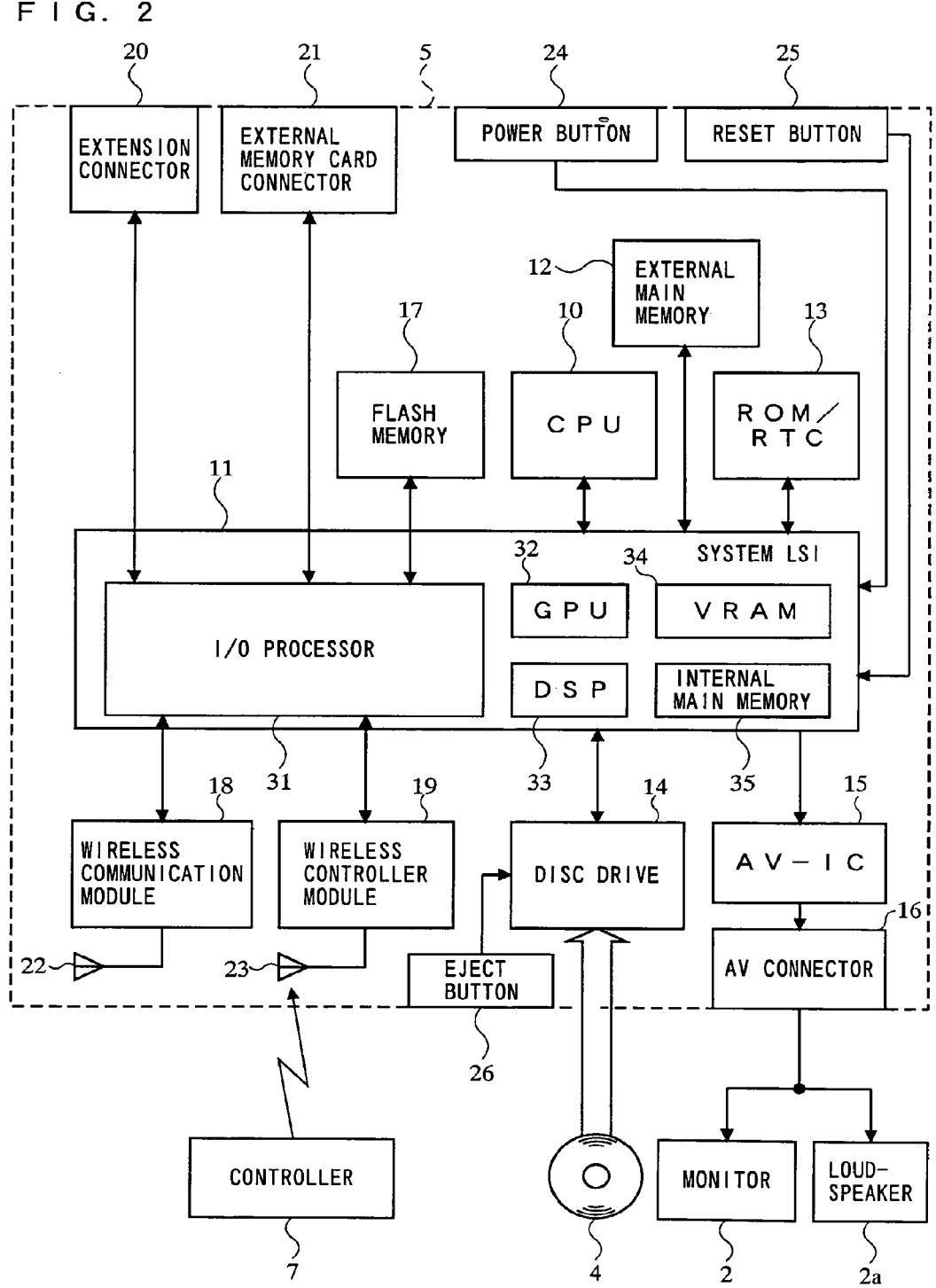
FIG. 2 is a functional block diagram of a game apparatus body 5 shown in FIG. 1.

With reference to FIG. 1, a display control apparatus, on which a display control program according to one embodiment of the present invention is executed, will be described. Hereinafter, for the sake of specific explanation, a game system including a stationary game apparatus body 5 will be described as an example of the display control apparatus. FIG. 1 is an external view of a game system 1 including a stationary game apparatus 3. FIG. 2 is a block diagram of the game apparatus body 5. Hereinafter, the game system 1 will be described.

As shown in FIG. 1, the game system 1 is composed of a home television receiver (hereinafter referred to as a monitor) 2, which is exemplary display means, and the stationary game apparatus 3 connected to the monitor 2 via a connection cord. The monitor 2 includes loudspeakers 2a for outputting an audio signal outputted from the game apparatus body 5. The game apparatus 3 includes an optical disc 4 having a game program stored thereon, the game apparatus body 5 incorporating a computer for executing the game program stored on the optical disc 4 and for outputting and displaying a game screen on the monitor 2, and a controller 7 for providing the game apparatus body 5 with operational information necessary for operating a play character or the like displayed on the game screen.

The game apparatus body 5 embeds therein a wireless controller module 19 (see FIG. 2). The wireless controller module 19 receives data wirelessly transmitted from the controller 7, and transmits the data from the game apparatus body 5 to the controller 7, thereby causing the controller 7 and the game apparatus body 5 to be connected to each other via wireless communication. The optical disc 4, which is an exemplary information storage medium exchangeably used to the game apparatus body 5, is detachably inserted to the game apparatus body 5.

The game apparatus body 5 is equipped with a flash memory 17 (see FIG. 2) which functions as a backup memory for fixedly storing data such as various data described later and save data saved during game software processing. On the game apparatus body 5, the game program or the like stored on the optical disc 4 is executed, and a result thereof is displayed on the monitor 2 as a game image. In addition to the optical disc 4, the game program or the like may be previously stored in the flash memory 17 and then executed. Further, on the game apparatus body 5, by using the save data stored in the flash memory 17, it is possible to reproduce a game state previously executed and to display the game image on the monitor 2. A player of the game apparatus body 5 views the game image displayed on the monitor 2, and enjoys a progress of the game while operating the controller 7.

As a first example, the display control program of the present invention is previously stored in an involatile storage apparatus (e.g., the flash memory 17) provided in the game apparatus body 5. As a second example, the display control program of the present invention is provided to the game apparatus body 5 via an external storage medium such as the optical disc 4. As a third example, the display control program of the present invention is provided to the game apparatus body 5 via a wired or wireless communication line. The game apparatus body 5, on which the display control program is executed, uses broadcast listing data provided thereto through the wired or wireless communication line and causes a broadcast listing indicated by the broadcast listing data to be displayed on the monitor 2.

The controller 7 wirelessly transmits transmission data such as operation information and the like by using a technique of Bluetooth (registered trademark) to the game apparatus body 5 having the wireless controller module 19 embedded therein. The controller 7 is operation means for mainly operating an object and the like displayed on a display screen of the monitor 2. The controller 7 has a housing of a size small enough to be held by one hand, and also has a plurality of operation buttons (including a cross key, a stick and the like) exposed on the surface of the housing. As will become clear later, the controller 7 includes an imaging information calculation section 74 for picking up an image as viewed from the controller 7. Further as an exemplary imaging target of the imaging information calculation section 74, two LED modules (hereinafter referred to as markers) 8L and 8R are located in the vicinity of the display screen of the monitor 2. The markers 8L and 8R each outputs infrared light, for example, forward from the monitor 2. The controller 7 is capable of receiving, by using communication section 75 provided therein, the transmission data wirelessly transmitted from the wireless controller module 19 of the game apparatus body 5, and generating a sound and vibration corresponding to the transmission data.

With reference to FIG. 2, an internal configuration of the game apparatus body 5 will be described. FIG. 2 is a block diagram showing a configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, the flash memory 17, and the like.

The CPU 10 executes the display control program stored in the flash memory 17 or the like, thereby performing the display control processing. That is, the CPU 10 functions as a display control processor. The CPU 10 also functions as a game processor, and executes a game process by executing the game program stored on the optical disc 4. The CPU 10 is connected to the system LSI 11. To the system LSI 11, not only the CPU 10, but also the external main memory 12, the ROM/RTC 13, the disc drive 14, and the AV-IC 15 are connected. The system LSI 11 performs processing such as control of data transmission among respective component parts connected thereto, generation of an image to be displayed, acquisition of data from an external apparatus, and the like. An internal configuration of the system LSI 11 will be described later. The external main memory 12, which is of a volatile type, stores therein programs such as the game program read from the optical disc 4 and the display control program read from the flash memory 17, and various data. The external main memory 12 is used as a work area and a buffer space for the CPU 10. The ROM/RTC 13 includes a ROM (so-called a boot ROM) incorporating a program for starting up the game apparatus body 5, and a clock circuit (RTC) for counting time. The disc drive 14 reads program data, texture data and the like from the optical disc 4, and writes the read data into an internal main memory 35 described later or the external main memory 12.

Further, provided to the system LSI 11 are an input/output (I/O) processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such, as polygon data and texture data) necessary for the GPU 32 to execute the graphics command. When an image is to be generated, the GPU 32 uses data stored in the VRAM 34 and generates the image data.

The DSP 33 functions as an audio processor, and generates audio data by using sound data and sound waveform (tone quality) data stored in the internal main memory 35 and the external main memory 12. In order to output a sound from the loudspeakers 2a, the DSP 33 reads the above-described sound data, and outputs the read data to the loudspeakers 2a via the AV-IC 15 and the AV connector 16, the loudspeakers 2 being provided on the monitor 2. In order to output the sound from the loudspeaker 706 (see FIG. 7) provided on the controller 7, the DSP 33 reads the above-described sound data and transmits the sound data to the controller 7 via the wireless controller module 19 and an antenna 23.

The image data and the audio data generated as above described are read by the AV-IC 15. The AV-IC 15 outputs the read image data to the monitor 2 via the AV connector 16, and also outputs the read audio data to the loudspeakers 2a embedded in the monitor 2. Accordingly, the image is displayed on the monitor 2, and the sound is outputted from the loudspeakers 2a.

The I/O processor 31 executes transmission of data among component parts connected thereto, and also executes download of data from an external apparatus. The I/O processor 31 is connected to the flash memory 17, the wireless communication module 18, the wireless controller module 19, an extension connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 at regular intervals so as to detect data, if any, which is necessary to be transmitted to the network. If the data is detected, the detected data is transmitted to the network via the wireless communication module 18 and the antenna 22. The I/O processor 31 receives data transmitted from another game apparatus and data (such as electronic broadcast listing data) downloaded from a download server via the network, the antenna 22 and the wireless communication module 18, and stores the received data in the flash memory 17. The CPU 10 executes the game program, and reads the data stored in the flash memory 17 so as to be used for executing the game program and the display control program. In the flash memory 17, not only data transmitted between the game apparatus body 5 and another game apparatus or various servers, but also save data of a game (result data or midstream data of the game) played by using the game apparatus body 5 may be stored.

The I/O processor 31 receives operation information and the like, which is transmitted from the controller 7 via the antenna 23 and the wireless controller module 19, and (temporarily) stores the operation information in the internal main memory 35 or in the buffer space of the external main memory 12. As with the external main memory 12, the internal main memory 35 may be used for storing therein the programs such as the game programs read from the optical disc 4 and from the flash memory 17, and various data, and may be used as the work area or the buffer space for the CPU 10.

The extension connector 20 and the external memory card connector 21 are connected to the I/O processor 31. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the extension connector 20 or the external memory card connector 21, and then saves data or reads data.

Provided to the game apparatus body 5 (for example, on the front main surface thereof) are a power button 24 of the game apparatus body 5, a reset button 25 of the game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button is turned on, power is supplied to each of the component parts of the game apparatus body 5 via an AC adaptor, which is not shown. When the reset button 25 is pressed, the system LSI 11 reactivates the start-up program of the game apparatus body 5. The eject button 26 is connected to the disc drive 14. When the eject button 26 is pressed, the optical disc 4 is ejected from the disc drive 14.

Figure 3:
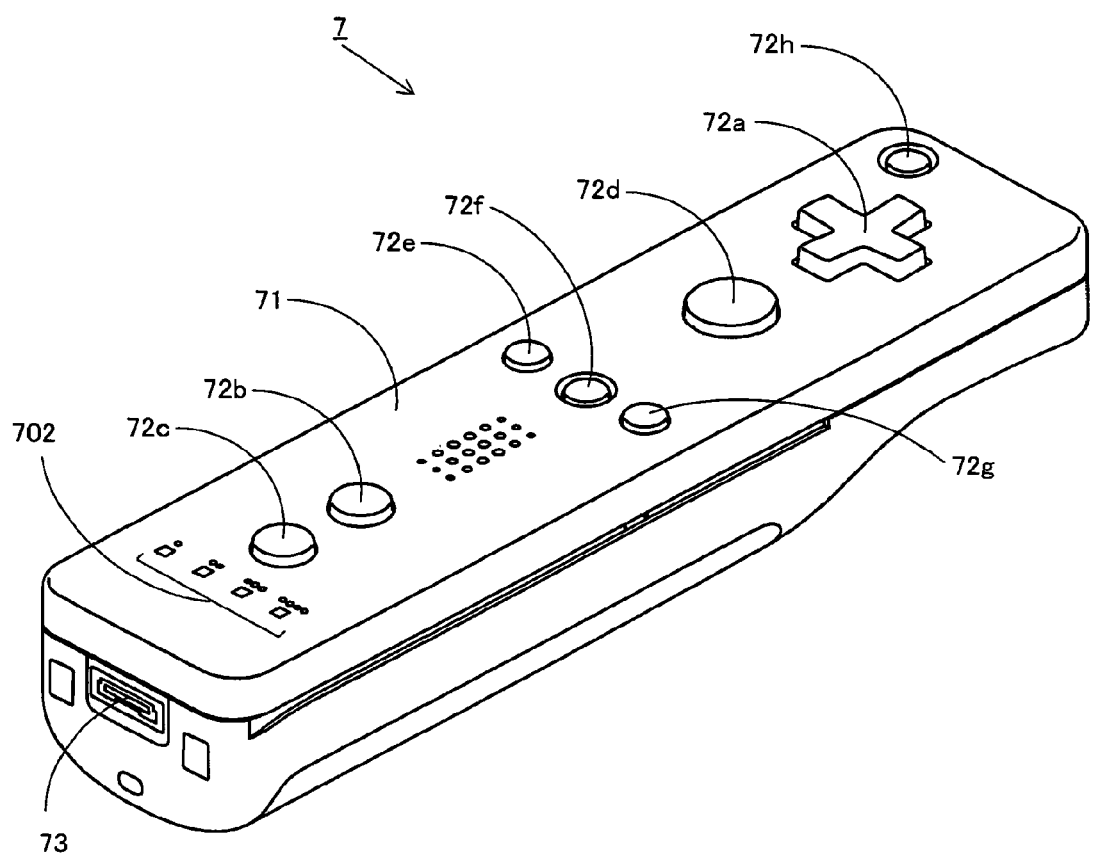
FIG. 3 is a perspective view of a controller 7 as viewed from a top rear side thereof shown in FIG. 1.
Figure 4:
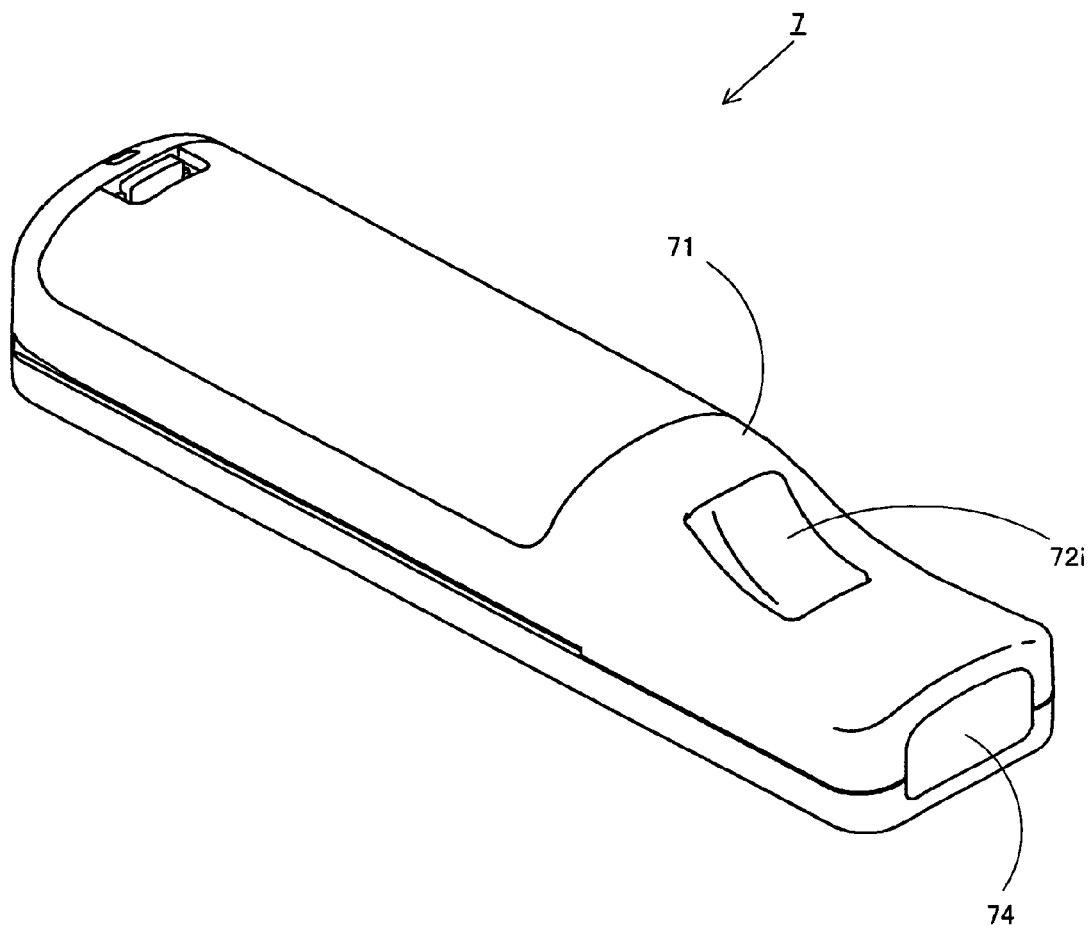
FIG. 4 is a perspective view of the controller 7 as viewed from a bottom front side thereof shown in FIG. 3.

With reference to FIGS. 3 and 4, the controller 7 will be described. FIG. 3 is a perspective view of the controller 7 as viewed from a top rear side thereof. FIG. 4 is a perspective view of the controller 7 as viewed from a bottom front side thereof.

As shown in FIGS. 3 and 4, the controller 7 includes a housing 71, which is formed by, for example, plastic molding, and a plurality of operation sections are provided on the housing. The housing has a substantially parallelepiped shape extending in a longitudinal direction from front to rear, and an overall size thereof is small enough to be held by one hand of an adult or even a child.

At a front center portion of a top surface of the housing 71, a cross key 72a is provided. The cross key 72a is a cross-shaped four direction push switch, and the operation portions thereof are respectively located on cross-shaped projecting portions arranged at intervals of 90 degrees such that the operation portions correspond to four directions (front, rear, right and left). A player selects one of the front, rear, right, and right directions by pressing one of the operation portions of the cross key 72a. Through an operation of the cross key 72a, the player can, for example, scroll and display a broadcast listing, indicate a direction in which a player character or the like appearing in a virtual game world is to move, or select an instruction from a plurality of choices.

The cross key 72a is an operation section for outputting an operation signal in accordance with the direction input operation performed by the player as above described, and such an operation may be provide in another form. For example, the operation section may be provided such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72*a* may be replaced with an operation section which includes an inclinable stick (so called a joystick) projecting from the top surface of the housing 71 and which outputs the operation signal in accordance with an inclining direction of the stick. Still alternatively, the cross key 72*a* may be replaced with an operation section which includes a disc-shaped member horizontally slidable and which outputs an operation signal in accordance with an sliding direction of the disc-shaped member. Still alternatively, the cross key 72*a* may be replaced with a touchpad.

Behind the cross key 72*a* on the top surface of the housing 71, a plurality of operation buttons 72*b*, 72*c*, 72*d*, 72*e*, 72*f* and 72*g* are provided. The operation buttons 72*b*, 72*c*, 72*d*, 72*e*, 72*f* and 72*g* are each an operation section for outputting an operation signal assigned thereto when the player presses a head thereof. For example, functions such as a No. 1 button, a No. 2 button, an A button and the like are assigned to the operation buttons 72*b*, 72*c* and 72*d*. Further, functions such as a minus button, a home button, a plus button and the like are assigned to the operation buttons 72*e*, 72*f* and 72*g*. Various operation functions are assigned to these operation buttons 72*a*, 72*b*, 72*c*, 72*d*, 72*e*, 72*f* and 72*g* in accordance with the game program executed by the game apparatus body 5. For example, when the operation button 72*b* (No. 1 button) or the operation button 72*c* (No. 2 button) is pressed, a character size of a broadcast displayed in a broadcast listing may be changed. When the operation button 72*e* (minus button) or the operation button 72*g* (plus button) is pressed, a time axis of the displayed broadcast listing may be changed. In an exemplary arrangement shown in FIG. 3, the operation buttons 72*b*, 72*c* and 72*d* are arranged in a line at the center in a front-rear direction on the top surface of the housing 71. Further, the operation buttons 72*e*, 72*f*, and 72*g* are arranged in a line on the top surface of the housing 71 in a left-right direction between the operation buttons 72*b* and 72*d*. The operation button 72*f* has a top surface thereof buried in the top surface of the housing 71 so as not to be inadvertently pressed by the player.

In front of the cross key 72*a* on the top surface of the housing 71, an operation button 72*h* is provided. The operation button 72*h* is a power switch for turning on and off the power to the game apparatus body 5 by remote control. The operation button 72*h* also has a top surface thereof buried in the top surface of the housing 71, so as not to be inadvertently pressed by the player.

Behind the operation button 72*c* on the top surface of the housing 71, a plurality of LEDs 702 is provided. A controller type (number) is assigned to the controller 7 such that the controller 7 is distinguishable from another controller 7. The LEDs 702 are used for, for example, informing the player about the controller type currently set for the controller. Specifically, a signal is transmitted, from the wireless controller module 19 to the controller 7, so as to light a LED corresponding to the above-described controller type among the plurality of LEDs 702:

On the top surface of the housing 71, loudspeaker holes for emitting a sound from a loudspeaker (the loudspeaker 706 shown in FIG. 5), which is described later, are formed between the operation button 72*b* and the operation buttons 72*e*, 72*f* and 72*g*.

On a bottom surface of the housing 71, a recessed portion is formed. The recessed portion on the bottom surface of the housing 71 is formed in a position in which an index finger or middle finger of the player is located when the player holds the controller 7 with one hand and points a front portion thereof to the markers 8L and 8R. On a slope surface of the recessed portion, an operation button 72*i* is provided. The operation button 72*i* is an operation section acting as, for example, a B button. For example, when the player points and moves the controller 7 while pressing the operation button 72*i*, the broadcast listing may be scroll-displayed.

On a front surface of the housing 71, an image pickup element 743 constituting a part of an imaging information calculation section 74 is provided. The imaging information calculation section 74 is a system which analyzes image data picked up by the controller 7, identifies an area having a high brightness point in the image, and detects a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

Figure 5:
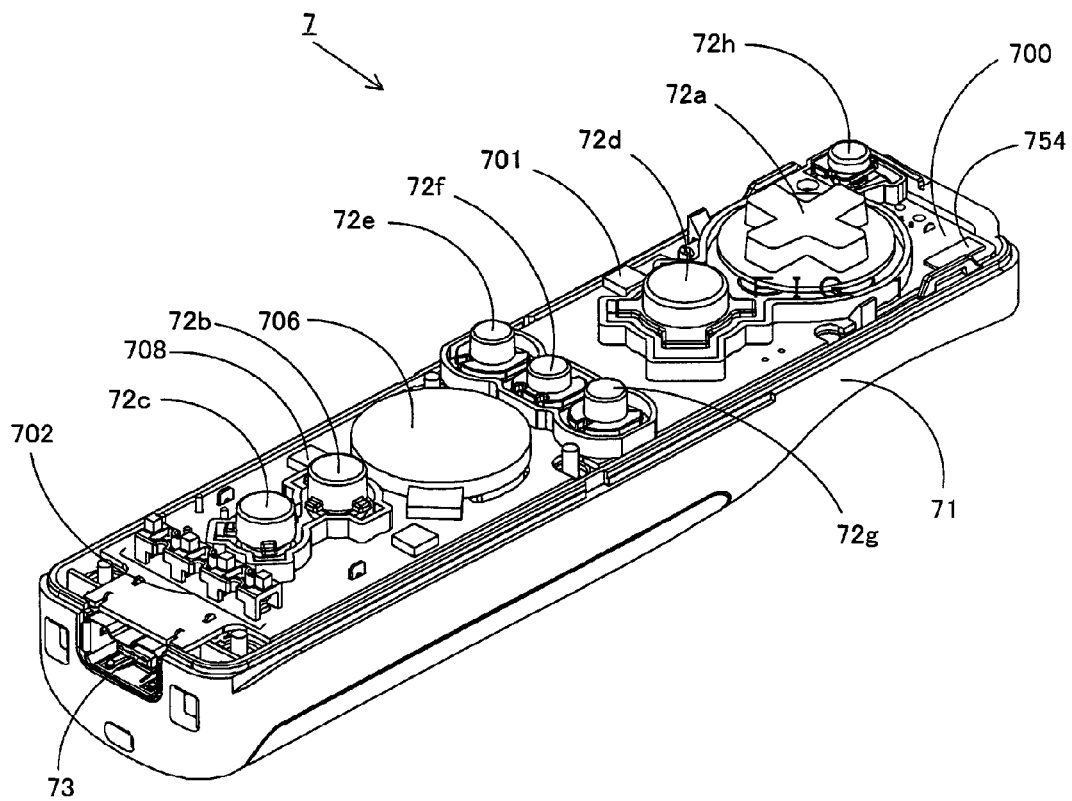
FIG. 5 is a perspective view of the controller 7 shown in FIG. 3 in a state where an upper housing thereof is removed.
Figure 6:
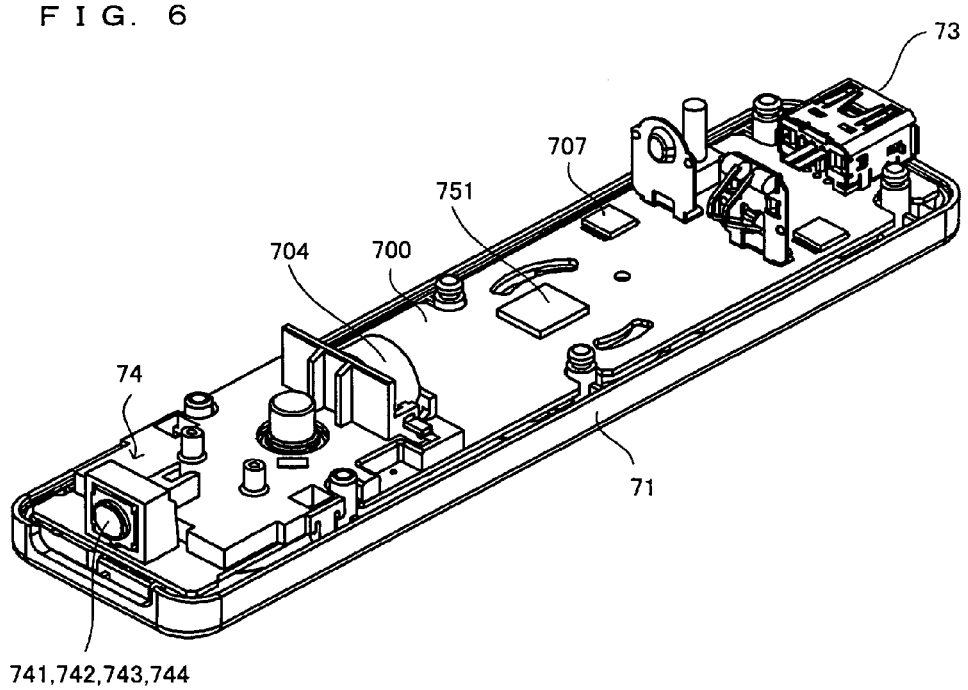
FIG. 6 is a perspective view of the controller 7 shown in FIG. 4 in a state where a lower housing thereof is removed.

With reference to FIGS. 5 and 6, an internal structure of the controller 7 will be described. FIG. 5 is a perspective view of the controller 7 as viewed from a rear side, the controller 6 being in a state where an upper housing (a part of the housing 71) of the controller 7 is removed. FIG. 6 is a perspective view of the controller 7 as viewed from a front side, the controller 7 being in a state where a lower housing (a part of the housing 71) of the controller 7 is removed. FIG. 6 is also a perspective view as viewed from a reverse side of a substrate 700 shown in FIG. 5.

As shown in FIG. 5, the substrate 700 is fixed inside the housing 71. Provided on a top main surface of the substrate 700 are the operation buttons 72*a*, 72*b*, 72*c*, 72*d*, 72*e*, 72*f*, 72*g* and 72*h*, an acceleration sensor 701, the LEDs 702, an antenna 754 and the like. These component parts are connected to a microcomputer 751 or the like (see FIGS. 6 and 7) by lines (not shown) formed on the substrate 700 or the like. The wireless module 753 (see FIG. 7) and the antenna 754 allow the controller 7 to act as a wireless controller. A quartz oscillator, which is not shown, is provided in an inside, of the housing 71, and generates a reference clock of the microcomputer 751 described later. On the top main surface of the substrate 700, the loudspeaker 706 and an, amplifier 708 are provided.

The acceleration sensor 701 is provided at the left side of the operation button 72*d* on the substrate 700 (that is, at a peripheral portion, instead of S center portion, on the substrate 700). Accordingly, the acceleration sensor 701 can detect, in accordance with a rotation centering on the longitudinal direction of the controller 7, acceleration caused by a centrifugal force element as well as directional variation in gravitational acceleration. Therefore, based on a predetermined calculation, the game apparatus body 5 and the like can detect, from the detected acceleration data, the motion of the controller 7 highly sensitively. For example, the controller 7 includes triaxial acceleration sensor 701. The triaxial acceleration sensor 701 detects linear acceleration in three directions, i.e., an up-down direction, a left-right direction and a front-rear direction. Data indicative of acceleration detected by the acceleration sensor 701 along the respective directions is outputted to the communication section 75.

As shown in FIG. 6, at a front edge of a bottom main surface of the substrate 700, the imaging information calculation section 74 is provided. The imaging information calculation section 74 includes an infrared filter 741, a lens 742, the image pick up element 743, and an image processing circuit 744, which are located in this order from the front side of the controller 7, and provided on the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 or the like, and outputs an audio signal to the loudspeaker 706 via the amplifier 708 in accordance with the audio data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 or the like, and an operation thereof is turned on/off in accordance with vibration data transmitted from the game apparatus body 5. The controller 7 is vibrated when the vibrator 704 is turned on, and vibration is conveyed to the player holding the controller. Thus, so-called a vibration-feedback game is realized. The vibrator 704 is located at a relatively front side of the housing 71, and thus the housing 71 vibrates to a large extent while the player is holding the housing 71, whereby the player feels vibration sensitively.

Figure 7:
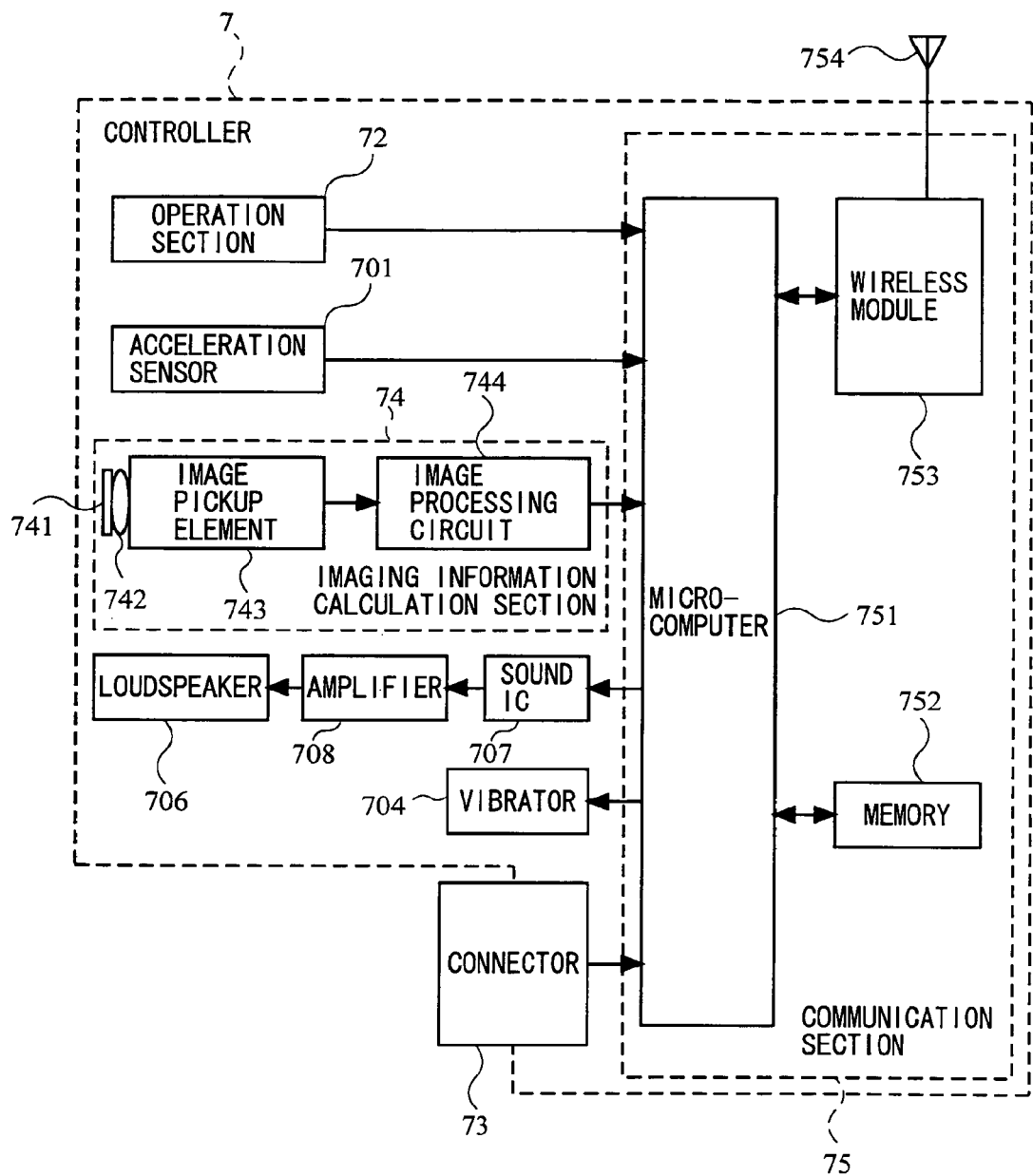
FIG. 7 is a block diagram showing a configuration of the controller 7 shown in FIG. 3.

With reference to FIG. 7, an internal configuration of the controller 7 will be described. FIG. 7 is a block diagram showing a configuration of the controller 7.

As shown in FIG. 7, the controller 7 includes thereinside a communication section 75, in addition to the operation sections 72, the imaging information calculation section 74, the acceleration sensor 701, the vibrator 704, the loudspeaker 706, the sound IC 707, and the amplifier 708 which are described as above.

The imaging information calculation section 74 includes the infrared filter 741, the lens 742, the image pickup element 743 and the image processing circuit 744. The infrared filter 741 allows only an infrared radiation to pass therethrough, the infrared radiation being included in the light which is incident on the front side of the controller 7. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an images of the infrared radiation converged by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743 and detects a high brightness point thereof, and outputs, to the communication section 75, a process result data indicative of a result of the detection of a position of the high brightness point. The imaging information calculation section 74 is fixed on the housing 71 of the controller 7, and an imaging direction of the housing 71 can be changed by changing the orientation of the housing 71.

The communication section 75 includes the microcomputer 751, a memory 752, the wireless module 753 and the antenna 754. The microcomputer 751 controls the wireless module 753 for wirelessly transmitting the transmission data while using the memory 752 as a storage area at the time of processing. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with the vibration data (e.g., signal for turning the vibrator 7040N or OFF) and the like which are transmitted from the game apparatus body 5 via the communication section 75.

Data from the controller 7 such as an operation signal (key data) from the operation section 72, acceleration signals (acceleration data) in three axes directions from the acceleration sensor 701, and the process result data from the imaging information calculation section 74 are outputted to the microcomputer 751. The microcomputer 751 temporarily stores the inputted data (the key data, the acceleration data, and the process result data) in the memory 752 as the transmission data to be transmitted to the wireless controller module 19. The wireless transmission from the communication section 75 to the wireless controller module 19 is performed at predetermined time intervals. Since the game process is generally performed at an interval of 1/60 sec., the wireless transmission needs to be performed at the interval of a shorter time period. Specifically, the game process is performed at the interval of 16.7 ms (1/60 sec.), and a transmission interval of the communication section 75, which is configured with the Bluetooth (registered trademark), is 5 ms, for example. At a timing of performing a transmission to the wireless controller module 19, the microcomputer 751 outputs the transmission data stored in the memory 752 to the wireless module 753 as a series of pieces of operation information. Based on the Bluetooth (registered trademark) technology, for example, the wireless module 753 emits, from the antenna 754, a radio signal indicative of the operation information by using a carrier wave having a predetermined frequency. Thus, the key data from the operation section 72, the acceleration data from the acceleration sensor 701, and the process result data from the imaging information calculation section 74 are transmitted from the controller 7. The radio signal is received by the wireless controller module 19 of the game apparatus body 5, and the radio signal is then demodulated or decoded in the game apparatus body 5, whereby the series of pieces of operation information (the key data, the acceleration data and the process result data) are obtained. The CPU 10 of the game apparatus body 5 performs the game process in accordance with the obtained operation information and the game program. In the case where the communication section 75 is configured with the Bluetooth (registered trademark) technology, the communication section 75 may have a function of receiving transmission data which is wirelessly transmitted from other devices.

In order to play a game on the game system 1 by using the controller 7, a user holds the controller 7 by one hand (e.g., the right hand). The user then holds the controller 7 such that the front surface (an entrance side on which light picked up by the imaging information calculation section 74 is incident) of the controller 7 faces the monitor 2. On the other hand, in the proximity of the display screen of the monitor 2, two markers 81, and 8R are arranged (see FIG. 1). The markers 8L and 8R each outputs the infrared radiation forward from the monitor 2, and constitutes an imaging target of the imaging information calculation section 74.

Figure 8:
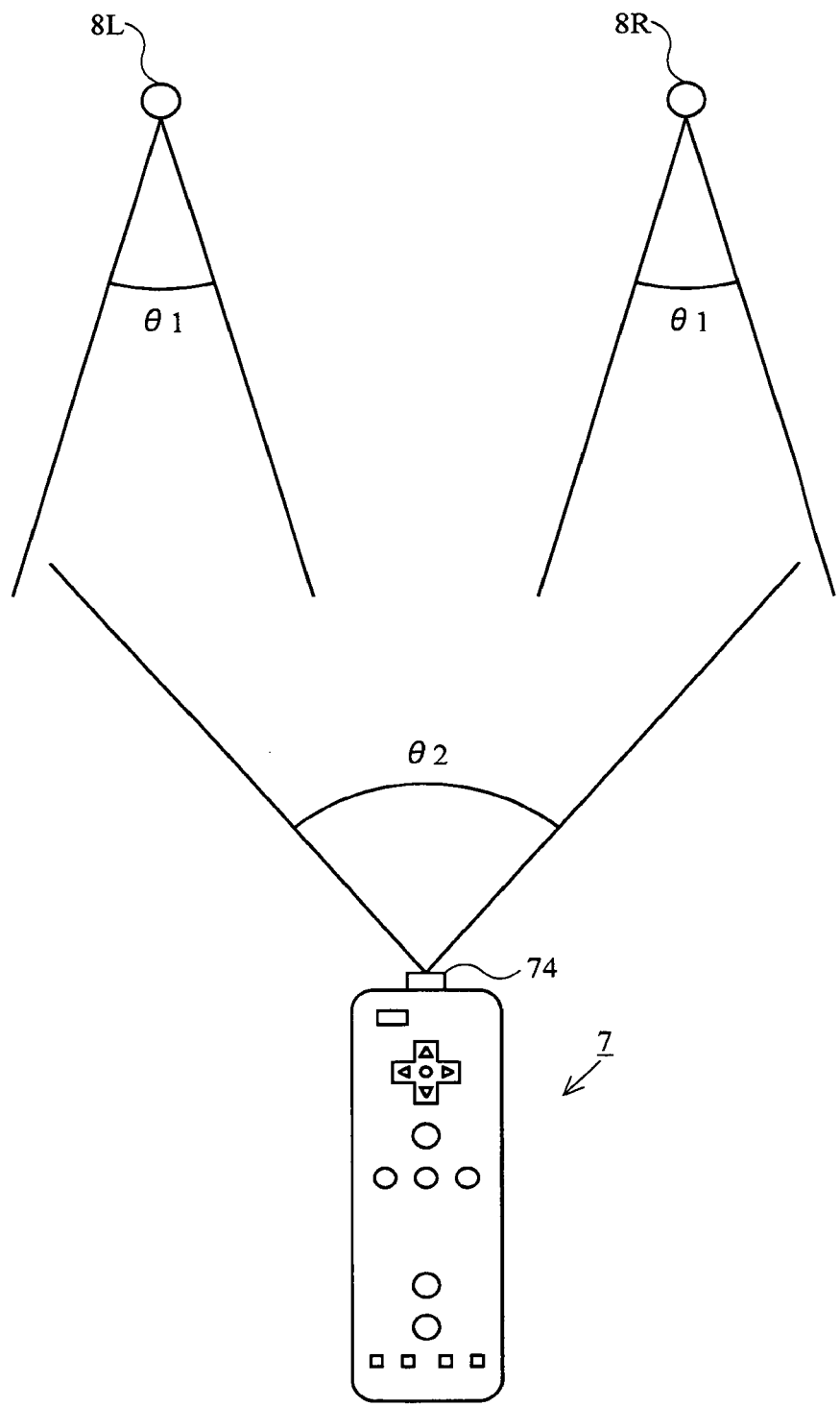
FIG. 8 is a diagram illustrating viewing angles of markers 8L and 8R, and an imaging information calculation section 74.

As shown in FIG. 8, the markers 8L and 8R each has a viewing angle of θ1. The image pickup element 743 has a viewing angle of θ2. For example, the viewing angle θ1 of each of the markers 8L and 8R is 34° (a half value angle), and the viewing angle θ2 of the image pickup element 743 is 41°. If the markers 8L and 8R are located within the viewing angle θ2 of the image pickup element 743, and the image pickup element 743 is located within the viewing angle θ1 of the marker 8L and within the viewing angle θ1 of the marker 8R, the game apparatus body 5 calculates a position pointed to by the controller 7 by using position data relating to the high brightness points generated by the markers 8L and 8R.

When the user holds the controller 7 such that the front surface thereof faces the monitor 2, the infrared radiations outputted from each of the markers 8L and 8R are incident on the imaging information calculation section 74. The image pickup element 743 picks up images of the incident infrared radiations via the infrared filter 741 and the lens 742, and the image processing circuit 744 processes the picked up images. In the imaging information calculation section 74, components of the infrared radiation outputted from each of the markers 8L and 8R are detected, whereby positional information (positions of target images) and the like of the markers 8L and 8R in the picked up image are obtained. Specifically, the image processing circuit 744 analyzes the image data picked up by the image pickup element 743, eliminates, from area information of the picked up image, images which are not generated by the infrared radiations outputted from the markers 8L and 8R, and then determines the high brightness points as the positions of the markers 8L and 8R. The imaging information calculation section 74 obtains positional information such as barycentric positions of the determined high rightness points, and outputs the positional information as the process result data. The positional information, which is the process result data, may be outputted as coordinate values whose origin point is set to a predetermined reference point on the picked up image (e.g., the center or the left top corner of the picked up image) Alternatively, a brightness point position at a predetermined timing may be set as a reference point position, and a difference between the reference point position and a current brightness point position may be outputted as a vector. That is, in the case where a predetermined reference point is set on the image picked up by the image pickup element 743, the positional information of the target images is used as parameters representing differences between the positions of the target images and the reference point position. The positional information is transmitted to the game apparatus body 5, whereby, based on the difference between the reference point position and the positional information, the game apparatus body 5 is capable of obtaining variations in signals which correspond to a movement, an attitude, a position and the like of the imaging information calculation section 74, i.e., the controller 7 with respect to the markers 8L and 8R. Specifically, when the controller 7 is moved, the high brightness point position on an image transmitted from the communication section 75 changes. Therefore, by inputting a direction or a coordinate point in accordance with a change in the high brightness point position, a position pointed to by the controller 7 is considered as an operation input, and a direction or a coordinate point can be inputted in accordance with a moving direction of the controller 7. In an exemplary operation in display control processing to be described later, the imaging information calculation section 74 at least obtains the coordinate points of the barycentric positions of the respective target images of the markers 8L and 8R on the picked up images, and outputs the obtained coordinate points as the process result data.

In this manner, the imaging information calculation section 74 of the controller 7 picks up the markers (the infrared radiations from the markers 8L and 8R in the embodiment) which is located fixedly, whereby data outputted from the controller 7 is processed in the game process on the game apparatus body 5, and an operation can be performed in accordance with the movement, the attitude, the position and the like of the controller 7. Further, it becomes possible to perform an intuitive operation input which is different from an input by pressing the operation button and the operation key. Since the above-described markers are located in the proximity of the display screen of the monitor 2, a position of the controller 7 with respect to the markers can be easily converted to the movement, the attitude, position and the like of the controller 7 with respect to the display screen of the monitor 2. That is, the process result data based on the movement, the attitude, the position and the like of the controller 7 is used as the operation input directly reflected on the display screen of the monitor 2 (e.g., inputting a position pointed to by the controller 7).

Figure 9:
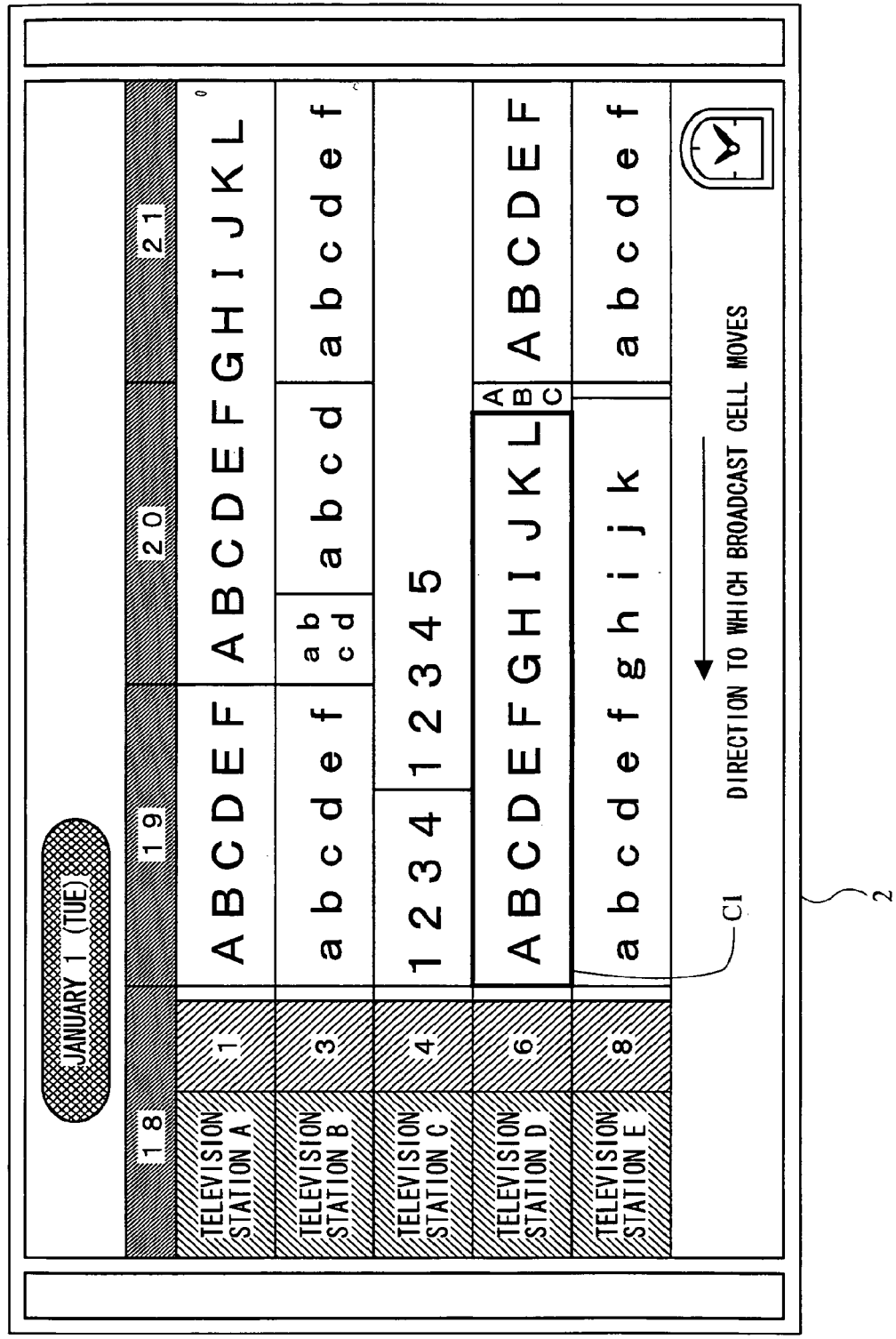
FIG. 9 is an exemplary screen showing a first state where a broadcast listing displayed on a monitor 2 is scroll-displayed.
Figure 10:
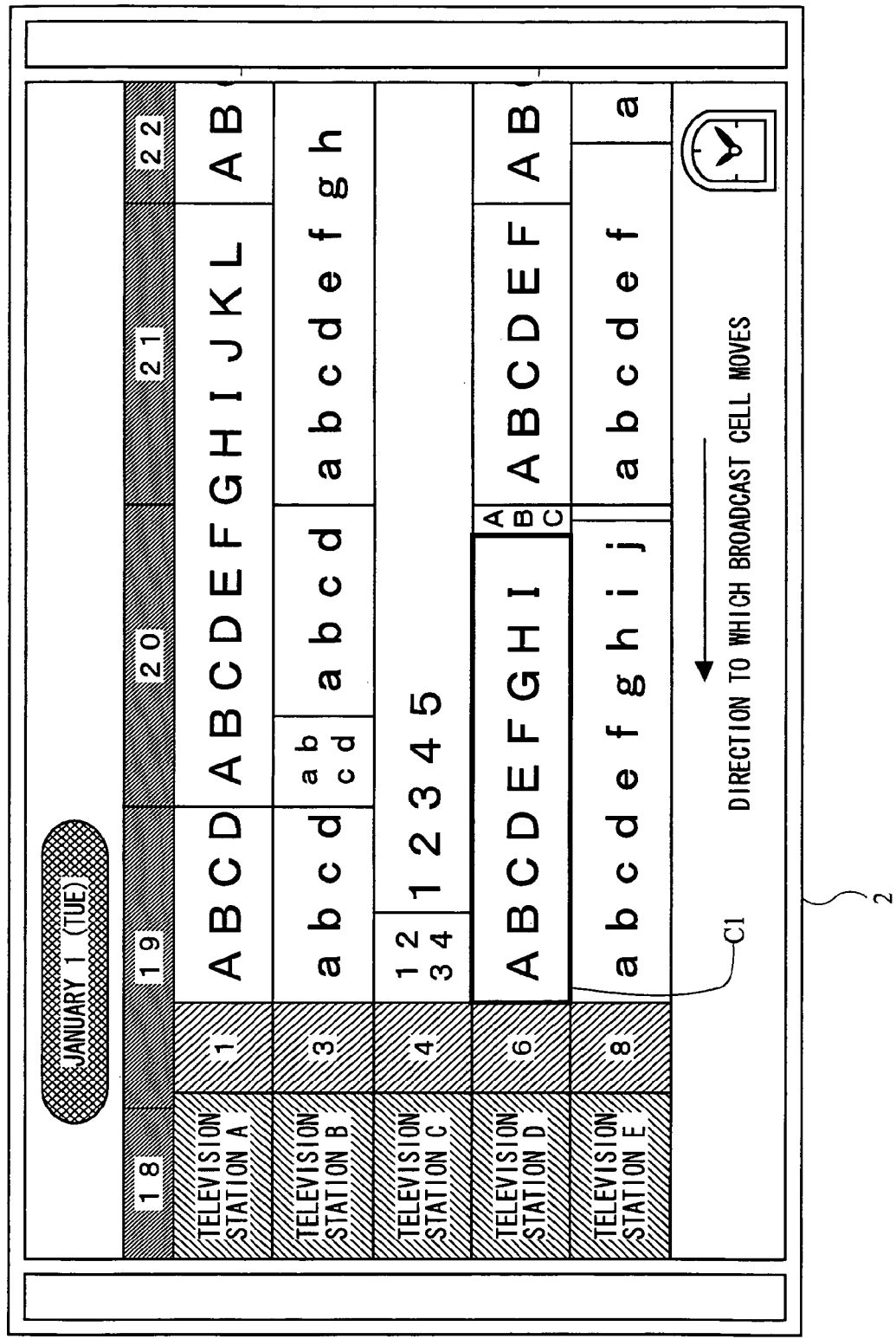
FIG. 10 is an exemplary screen showing a second state where the broadcast listing displayed on the monitor 2 is scroll-displayed.
Figure 11:
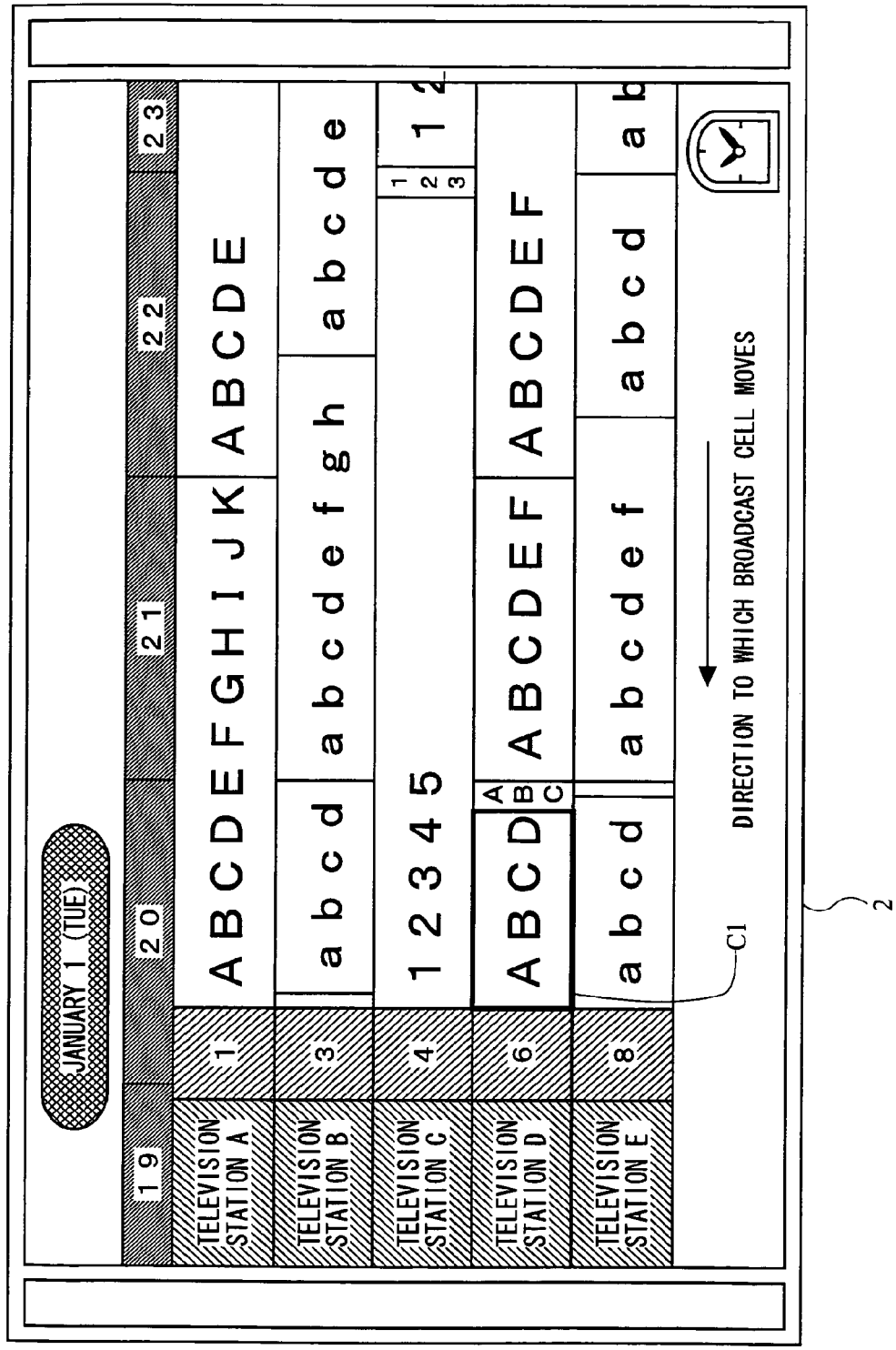
FIG. 11 is an exemplary screen showing a third state where the broadcast listing displayed on the monitor 2 is scroll-displayed.
Figure 12:
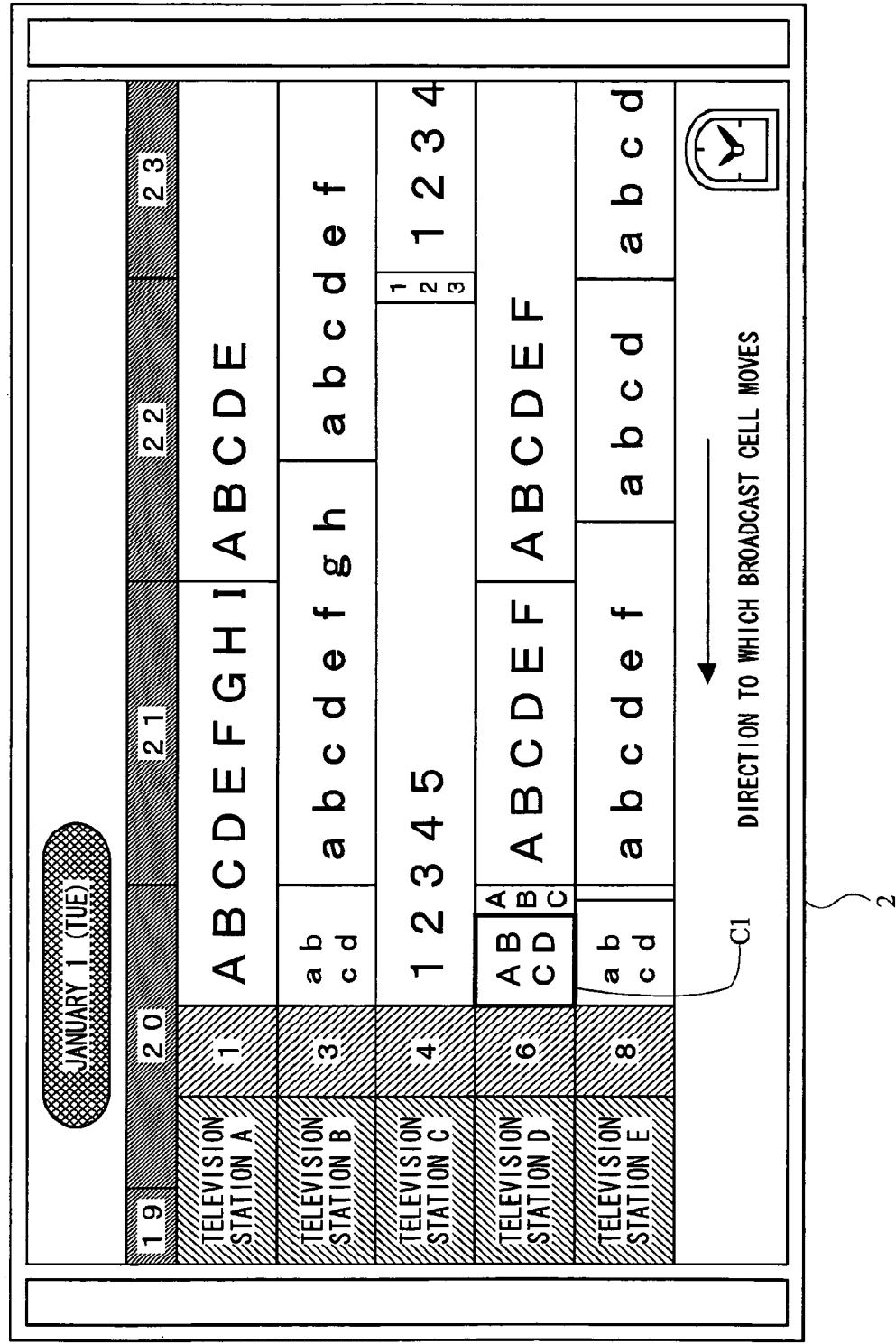
FIG. 12 is an exemplary screen showing a fourth state where the broadcast listing displayed on the monitor 2 is scroll-displayed.
Figure 13:
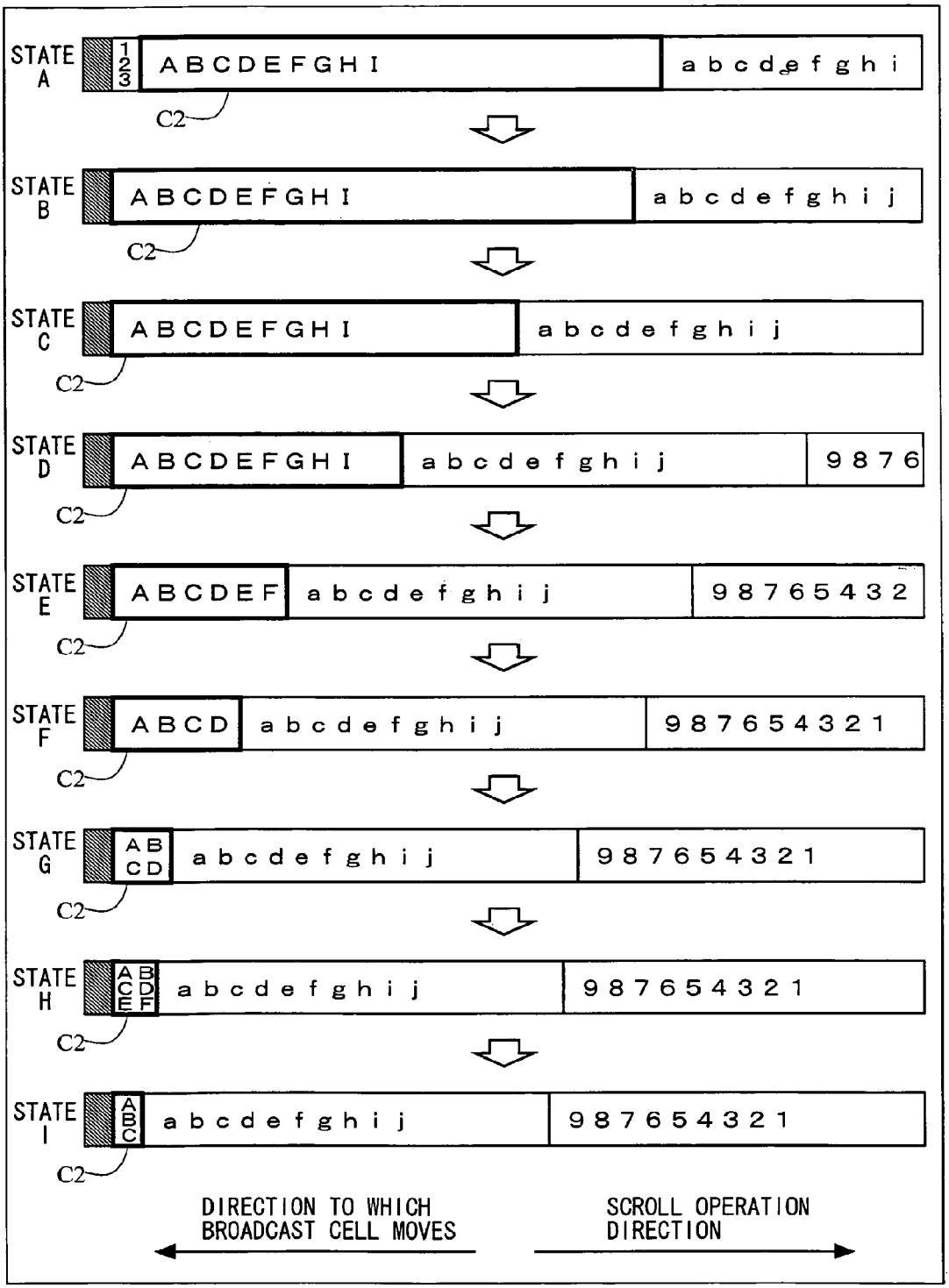
FIG. 13 is an exemplary screen showing an example of a series of changes in a display mode of a broadcast cell C2 in the broadcast listing scroll-displayed on the monitor 2.

With reference to FIGS. 9 to 13, exemplary screen displayed on the monitor 2 in accordance with the user's operation will be described. FIG. 9 is an exemplary screen illustrating a first state where a broadcast listing displayed on the monitor 2 is scroll-displayed. FIG. 10 is an exemplary screen illustrating a second state where the broadcast listing displayed on the monitor 2 is scroll-displayed. FIG. 11 is an exemplary screen illustrating a third state where the broadcast listing displayed on the monitor 2 is scroll-displayed. FIG. 12 is an exemplary screen illustrating a fourth state where the broadcast listing displayed on the monitor 2 is scroll-displayed. FIG. 13 is an exemplary screen showing an example of a series of changes in a display mode of a broadcast cell C2 in the broadcast listing scroll-displayed on the monitor 2.

As shown in each of FIGS. 9 to 12, the broadcast listing is displayed on the monitor 2 in a matrix form, where a horizontal axis represents a time axis, and a vertical axis represents a broadcast station axis. Specifically, broadcast cells corresponding to time frames, in which television stations broadcast respective broadcasts, are set respectively, and a broadcast title is described in characters in each of the broadcast cells. By pressing a predetermined button of the controller 7, or changing a position pointed with the controller 7, the user can change a character size of the broadcast title, scroll the broadcast listing, and expand or shorten a length of the time axis. For example, when the user presses the operation button 72b (No. 1 button) or the operation button 72c (No. 2 button), the character size of the broadcast title is changed. When the user presses the operation button 72e (minus button) or the operation button 72g (plus button), the length of the time axis of the displayed broadcast listing is expanded or shortened. Further, when the user moves the position pointed to by the controller 7 while pressing the operation button 72i, or when the user presses the operation button 72a (cross key), the broadcast listing is scroll-displayed. An exemplary display in which the broadcast listing is scroll-displayed will be described hereinafter.

For example, as shown in FIG. 9, a broadcast listing is displayed in which the time axis shows three hourly time frames, respectively staring from 1900, 2000 and 2100 hours, and the broadcast station axis shows five television stations A, B, C, D and E. As to a display mode shown in FIG. 9, most of broadcast titles described in the broadcast cells for the respective television stations are written in a "medium" character size, which is a currently targeted display character size, and each of the broadcast title is described from the first character of the broadcast title. As to broadcasts each having short broadcasting hours, the broadcast titles are described in a "small" character size or in an "extra small" character size from the first characters of the broadcast titles. Alternatively, the broadcast titles are not described in the respective broadcast cells for the broadcasts. For example, in a broadcast cell for a broadcast which is broadcasted on the television station A during a 1900 hours time frame, the broadcast title "ABC-DEF" is described in the "medium" character size. Further, in a broadcast cell for a broadcast which is broadcasted on the television station B in a first half of a 2000 hours time frame, the broadcast title "abcd" is descried in the "small" character size. Note that there are four character sizes, i.e., "large", "medium", "small", and "extra small" character sizes, to be displayed in the respective broadcast cells of the present embodiment. Now, a broadcast cell C1 for a broadcast, which is broadcasted on the television station D from the beginning of the 1900 hours time frame till nearly the end of the 2000 hours time frame, will be focused. In the broadcast listing shown in FIG. 9, the whole of the broadcast cell is displayed from the beginning of the 1900 hours time frame till the end of the 2000 hours time frame, and thus a broadcast title "ABCDEFGHIJKL" is described with 12 characters in the "medium" character size in the broadcast cell C1.

Hereinafter, a case will be described where the user performs a scroll operation with respect to the broadcast listing displayed as above described in order to display hourly time frames on the right side of the broadcast listing, the hourly time frames not being displayed currently. As the scroll operation to display the hourly time frames on the right side, the user scrolls toward the right direction (e.g., by pointing the controller 7 to the right side of the broadcast listing, while pressing the operation button 72i of the controller 7, or by pressing the right direction of the operation button 72a (cross key)). In accordance with the scroll operation, the respective broadcast cells currently displayed moves to the left, and new broadcast cells, which are not currently displayed, are to appear from the right side of the broadcast listing. A moving speed of the each of the broadcast cells is determined in accordance with the scroll operation by the user. For example, the moving speed and moving direction of each of the broadcast cells are determined in accordance with a distance and a direction from the center of the broadcast listing or the center of the display screen to a point pointed to by the controller 7.

FIG. 10 shows the broadcast listing in which the time axis moves, due to the above-described scroll operation, to the right by a time length of about 30 minutes from a state of the broadcast listing shown in FIG. 9. Accordingly, the broadcast listing is displayed in which the time axis represents three hours ranging from a second half of the 1900 hours time frame to a second half of 2200 hours time frame and the broadcast station axis represents five stations; i.e., television stations A, B, C, D and E. In accordance with the scroll display resulting from the scroll operation, portions of new broadcast cells in a 2200 hours time frame appear from the right side of the broadcast listing (e.g., for television stations A, D and E). On the other hand, with respect to the broadcast cells in the 1900 hours time frame, due to the above-described scroll display, the left side portions of the display areas thereof fall outside the display area, and thus are trimmed. In the present embodiment, a portion of each of the broadcast cells excluding the trimmed area is regarded as a drawing area, and the broadcast title is described in the drawing area from the first character of the broadcast title. Specifically, the broadcast title in each of the broadcast cell is described from a left edge of the broadcast cell excluding the trimmed area, and thus, at the left edge of the broadcast listing, the broadcast title is consistently arranged from the first character thereof in each of the broadcast cells. That is, as is clear when FIG. 9 and FIG. 10 are compared with each other, in each of the broadcast cells located at the left edge of the broadcast listing, the broadcast title is displayed as if the broadcast title is not moved even if the scroll operation is performed.

For example, in the broadcast cell C1, the broadcast title "ABCDEFGHI" is described with nine characters from the first character of the broadcast title in the "medium" character size. As compared with a display state shown in FIG. 9, the number of characters described in the broadcast cell C1 is decreased by three characters. This is because, in the broadcast listing shown in FIG. 10, the broadcast title is displayed from the second half of the 1900 hours time frame to the end of the 2000 hours time frame, and a portion of the drawing area of the broadcast cell C1, the portion corresponding to the first half of the 1900 hours time frame, is trimmed.

FIG. 11 shows the broadcast listing in which the time axis moves further, to the left by the time length of about one hour from the state of the broadcast listing shown in FIG. 10. Accordingly, the broadcast listing is displayed in which the time axis represents three hours ranging from the first half of the 2000 hours time frame to the first half of a 2300 hours time frame, and the broadcast station axis represents five stations, i.e., television stations A, B, C, D and E. In accordance with the scroll display resulting from the scroll operation, portions of new broadcast cells in the 2300 hours time frame appear from the right side of the broadcast listing (e.g., for the television stations C and E). On the other hand, with respect to the broadcast cells in the 2000 hours time frame, the left sides of the display areas thereof fall outside the display area due to the scroll display and consequently are trimmed.

For example, in the broadcast cell C1, the broadcast title "ABCD" is described with four characters from the first character of the broadcast title in the "medium" character size. As compared with the display state shown in FIG. 10, the number of characters described in the broadcast cell C1 is further decreased by five characters. The broadcast listing shown in FIG. 11 displays the second half of the 2000 hours time frame, and this results from the fact that a portion of the drawing area of the broadcast cell C1, the portion corresponding to the time frames ranging from the 1900 hours time frame to the first half of the 2000 hours time frame, is trimmed.

FIG. 12 displays the broadcast listing in which the time axis is further moved to the right by the time length of approximately 30 minutes from the state of the broadcast listing shown in FIG. 11. Accordingly, the broadcast listing is displayed in which the time axis represents three hours ranging from the second half of the 2000 hours time frame to the first half of the 2300 hours time frame, and the broadcast station axis represents five stations, i.e., from television stations A, B, C, D and E. In accordance with the scroll display resulting from the scroll operation, the left side portions of the display areas of the broadcast cells in the 2000 hours time frame fall outside the display area, and thus are trimmed.

For example, in the broadcast cell C1, the broadcast title "ABCD" is displayed with four characters from the first character of the broadcast title in a "small" character size in a display form of 2 lines×2 columns. As compared with the display state shown in FIG. 11, the character size described in the broadcast cell C1 is reduced, and accordingly the number of characters described therein is not changed. This is because, in the broadcast listing shown in FIG. 12, only the second half of the 2000 hours time frame is displayed, and consequently a most portion of the drawing area of the broadcast cell C1 is trimmed, the most portion corresponding to the time frames ranging from the 1900 hours time frame to the first half of 2000 hours time frame. This is also because, as a rule, at least three characters of the broadcast title are to be displayed on the monitor 2. Specifically, the broadcast cell C1 whose drawing area, has been trimmed becomes of a size in which three characters cannot be described in the "medium" character size. Instead, the broadcast cell 1 becomes of a size in which four characters can be described in the "small" character size in the display form of 2 lines×2 columns. In this case, in the broadcast cell C1, the broadcast title is described in the "small" character size.

FIG. 13 shows a transitional state in which a broadcast title described in broadcast cell C2 changes in accordance with the scroll display. In FIG. 13, a shaded area indicates a left edge of a display area in which the broadcast cells can be displayed, and FIG. 13 shows an example where in accordance with the scroll operation toward the right performed by the user, the respective broadcast cells are scrolled towards the left edge direction. Suppose that, in the broadcast cell C2, a broadcast title "ABCDEFGHI" having nine characters is described in the "medium" character size. Also suppose that, as a rule, the broadcast title to be displayed in each of the broadcast cells needs to be described at least with three characters.

In a state A shown in FIG. 13, the whole area of the broadcast cell C2 stays within the display area, and the drawing area of the broadcast cell C2 is of a size in which nine or more characters can be described in the "medium" character size. Therefore, in the broadcast cell C2 in the state A, the broadcast title "ABCDEFGHI" is described from the first character thereof in the "medium" character size.

In a state B shown in FIG. 13, a left edge of the broadcast cell C2 has contact with the left edge of the display area. In this case, as with the state A, the drawing area of the broadcast cell C2 is of the size in which nine or more characters can be described in the "medium" character size. Therefore, in the broadcast cell C2 in the state B, the broadcast title "ABCDEFGHI" is described from the first character thereof in the "medium" character size.

In states C and D shown in FIG. 13, the left edge of the broadcast cell C2 falls outside the display area, and thus the drawing area of the broadcast cell C2 is trimmed. However, the drawing area having been trimmed is still of the size in which nine or more characters can be described in the "medium" character size. Therefore, in the broadcast cell C2 in each of the states C and D, the broadcast title "ABCDEFGHI" is described as it is in the "medium" character size from the left edge of the broadcast cell staying within the display area (that is, from the left edge of the drawing area having been trimmed).

In a state E shown in FIG. 13, the left edge of the broadcast cell C2 further falls outside the display area, and thus the drawing area of the broadcast cell C2 is trimmed. Accordingly, the drawing area having been trimmed becomes of a size in which six characters can be described in the "medium" character size. Therefore, in the broadcast cell C2 in the state E, only six characters of the broadcast title "ABCDEFGHI" are described from the first character thereof in the "medium" character size from the left edge of the broadcast cell staying within the display area.

In a state F shown in FIG. 13, the left edge of the broadcast cell C2 further falls outside the display area, and thus, the drawing area of the broadcast cell C2 is further trimmed. Accordingly, the drawing area having been trimmed becomes of a size in which four characters can be described in the "medium" character size. Therefore, in the broadcast cell C2 in the state F, only four characters of the broadcast title "ABCDEFGHI" are described from the first character thereof in the "medium" character size from the left edge of the broadcast cell staying within the display area.

In a state G shown in FIG. 13, the left edge of the broadcast cell C2 further falls outside the display area, and thus, the drawing area of the broadcast cell C2 is further trimmed. Accordingly, the drawing area having been trimmed becomes of a size in which four characters can be described in the "small" character size in a display form of 2 lines×2 columns. Therefore, in the broadcast cell C2 in the sate G, only four characters of the broadcast title "ABCDEFGHI" are described in the "small" character size from the first character thereof in the form of 2 lines×2 columns from the left edge of the broadcast cell staying within the display area.

In a state H shown in FIG. 13, the left edge of the broadcast cell C2 further falls outside the display area, and thus, the drawing area of the broadcast cell C2 is further trimmed. Accordingly, the drawing area having been trimmed becomes of a size in which six characters can be described in the "extra small" character size in a display form of 3 lines×2 columns. Therefore, in the broadcast cell C2 in the state H, only six characters of the broadcast title "ABCDEFGHI" are described in the "extra small" character size from the first character thereof in the display form of 3 lines×2 columns from the left edge of the broadcast cell staying within the display area.

In a state I shown in FIG. 13, the left edge of the broadcast cell C2 further falls outside the display area, and thus, the drawing area of the broadcast cell C2 is further trimmed. Accordingly, the drawing area having been trimmed becomes of a size in which three characters can be described in the "extra small" character size in a display form of 3 lines×1 column. Therefore, in the broadcast cell C2 in the state I, three characters of the broadcast title "ABCDEFGHI" are described from the first character thereof in the "extra small" character size in the display form of 3 lines×1 column from the left edge of the broadcast cell staying within the display area. When the left edge of the broadcast cell C2 further falls outside the display area from the state I shown in FIG. 13, and the drawing area having been trimmed becomes of a size in which three characters cannot be described even in the "extra small" character size, then no broadcast title is displayed in the broadcast cell.

Next, display control processing performed on the game system 1 will, be described in detail. First, with reference to FIGS. 14 and 15, major data used in the display control processing will be described. FIG. 14 is a diagram showing an example of the major data stored in the external main memory 12 and/or the internal main memory 35 (hereinafter collectively referred to as a main memory) of the game apparatus body 5. FIG. 15 is a diagram showing, in detail, exemplary contents of broadcast cell data Db2 shown in FIG. 14.

As shown in FIG. 14, operation information Da, broadcast listing data Db and the like are stored in the main memory. In the main memory, in addition to the data included in the information shown in FIG. 19, data necessary for information processing and the display control processing is stored as appropriate.

The operation information Da stores therein the series of pieces of the operation information (the key data, the acceleration data and the process result data) transmitted from the controller 7 as the transmission data, and the operation information is updated to latest operation information. The operation information Da includes first coordinate point data Da1 and second coordinate point data Da2 which correspond to the positional information of the process result data. The first coordinate point data Da1 represents data indicative of a position of an image of either of the markers 8L and 8R with respect to the image picked up by the image pick up element 743 (a position within the picked up image). The second coordinate point data Da2 represents data indicative of a position of an image (a position within the picked up image) of the other marker. For example, the positions of the images of the markers in the picked up image are represented by an xy coordinate system in the picked up image.

The operation information Da includes key data Da3 and the like obtained from the operation section 72, in addition to the coordinate point data (first coordinate point data Da1 and the second coordinate point data Da2), which is exemplary process result data obtained from the picked up image. The wireless controller module 19 provided in the game apparatus body 5 receives the series of pieces of operation information transmitted from the controller 7 at a predetermined interval of 5 ms, for example, and stores the operation information in a buffer (not shown) provided in the wireless controller module 19. The latest operation information stored in the buffer is read at the interval of one frame (e.g., 1/60 sec.), which is an interval of the game process, and the operation information Da stored in the main memory is updated.

The broadcast listing data Db stores therein information for displaying the broadcast listing on the monitor 2. The broadcast listing data Db includes display area coordinate point data Db1, broadcast cell data Db2, scroll vector data Db3, targeted display character size data Db4, image data Db5 and the like.

The display area coordinate point data Db1 stores therein the coordinate point data indicative of a position of a display area, in the broadcast listing, to be displayed on the monitor 2 (e.g., positions of a left top corner and a right bottom corner of the display area). The broadcast cell data Db2 stores therein data indicative of information on respective broadcast cells included in the broadcast listing, which will be described later in detail. The scroll vector data Db3 stores therein data indicative of a scroll speed and a scroll direction (a scroll vector scv) on the broadcast listing, which are set by operation input by the user. The targeted display character size data Db4 stores therein data indicative of a targeted character size for displaying the broadcast listing, i.e., a targeted display character size (, for example, set by the user's operation). The image data Db5 stores therein data indicative of various images so as to display the broadcast listing on the monitor 2.

As shown in FIG. 15, information included in the broadcast cell data Db2 is updated as appropriate by using electronic broadcast listing data which is obtained through communication with various servers connected to the network via the wireless communication module 18 and the antenna 22. The broadcast cell data Db2 is set for each of the broadcast cells arranged in the broadcast listing. The broadcast cell data Db2 includes a broadcast cell number Db2$a$, broadcast title character string data Db2$b$, number-of-broadcast-title-characters data Db2$c$, television station data Db2$d$, broadcast cell coordinate point data Db2$e$, drawing area width data Db2$f$, drawing area height data Db2$g$, drawing character size data Db2$h$, drawable-number-of-lines data Db2$i$, drawable-number-of-characters data Db2$j$, drawing start point data Db2$k$ and the like which are set to each of the broadcast cells.

The broadcast cell number Db2$a$ stores therein sequential numbers which are each set to each of the broadcast cells (e.g., broadcast cell number "1" as shown in FIG. 15). The broadcast title character string data Db2$b$ stores therein character string data indicative of the broadcast title (e.g., broadcast title character string "ABCDEFGH" as shown in FIG. 15) to be described in each of the broadcast cells. The number-of-broadcast-title-characters data Db2$c$ stores therein the number of characters of the broadcast title in each of the broadcast cells (e.g., the number of the broadcast title characters "8" as shown in FIG. 15). The television station data Db2$d$ stores therein data indicative of the television station (e.g., television station "A" as shown in FIG. 15) with respect to which each of the broadcast cells is arranged. The broadcast cell coordinate point data Db2$e$ stores therein data indicative of a position of each of the broadcast cells in the broadcast listing (e.g., a left top corner coordinate point (xsa, ysa) and a right bottom corner coordinate point (xsb, ysb) as shown in FIG. 15). The drawing area width data Db2$f$ stores therein data indicative of a drawing area width of each, of the broadcast cells, the width in which the broadcast title is drawable (e.g., a drawing area width "dw" as shown in FIG. 15). The drawing area height data Db2$g$ stores therein data indicative of a drawing area height of each of the broadcast cells, the height in which the broadcast title is drawable (e.g., a drawing area height "dh" as shown in FIG. 15). The drawing character size data Db2$h$ stores therein data indicative of the character size of the broadcast title to be described in each of the broadcast cells (e.g., the "small" character size as shown in FIG. 15). The drawable-number-of-lines data Db2$i$ stores therein data indicative of the number of lines in each of the broadcast cells, the lines on which the broadcast title is drawable (e.g., the drawable number of lines "2" as shown in FIG. 15). The drawable-number-of-characters data Db2$j$ stores therein data indicative of the number of characters of the broadcast title drawable in each of the broadcast cells (e.g., the drawable number of characters "4" as shown in FIG. 15). The drawing start point data Db2$k$ stores therein data indicative of a point of the drawing area of the broadcast cell in the case where the drawing area is partially trimmed, the point from which the first character of the broadcast title is drawn (e.g., the left top corner coordinate point (xsc, ysc) on the drawing area having been trimmed as shown in FIG. 15).

Figure 16:
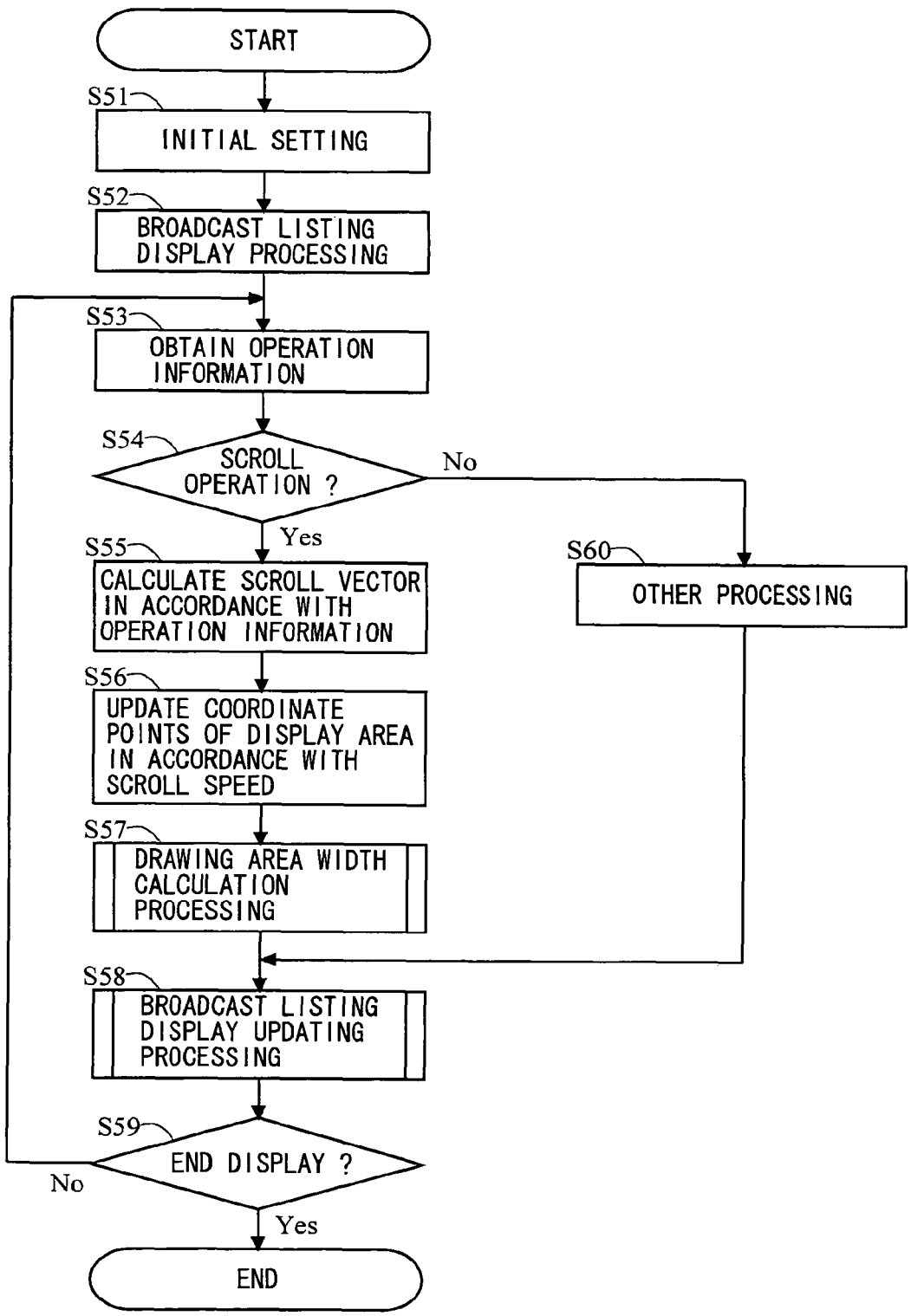
FIG. 16 is a flowchart showing a flow of display control processing performed on the game apparatus body 5.
Figure 17:
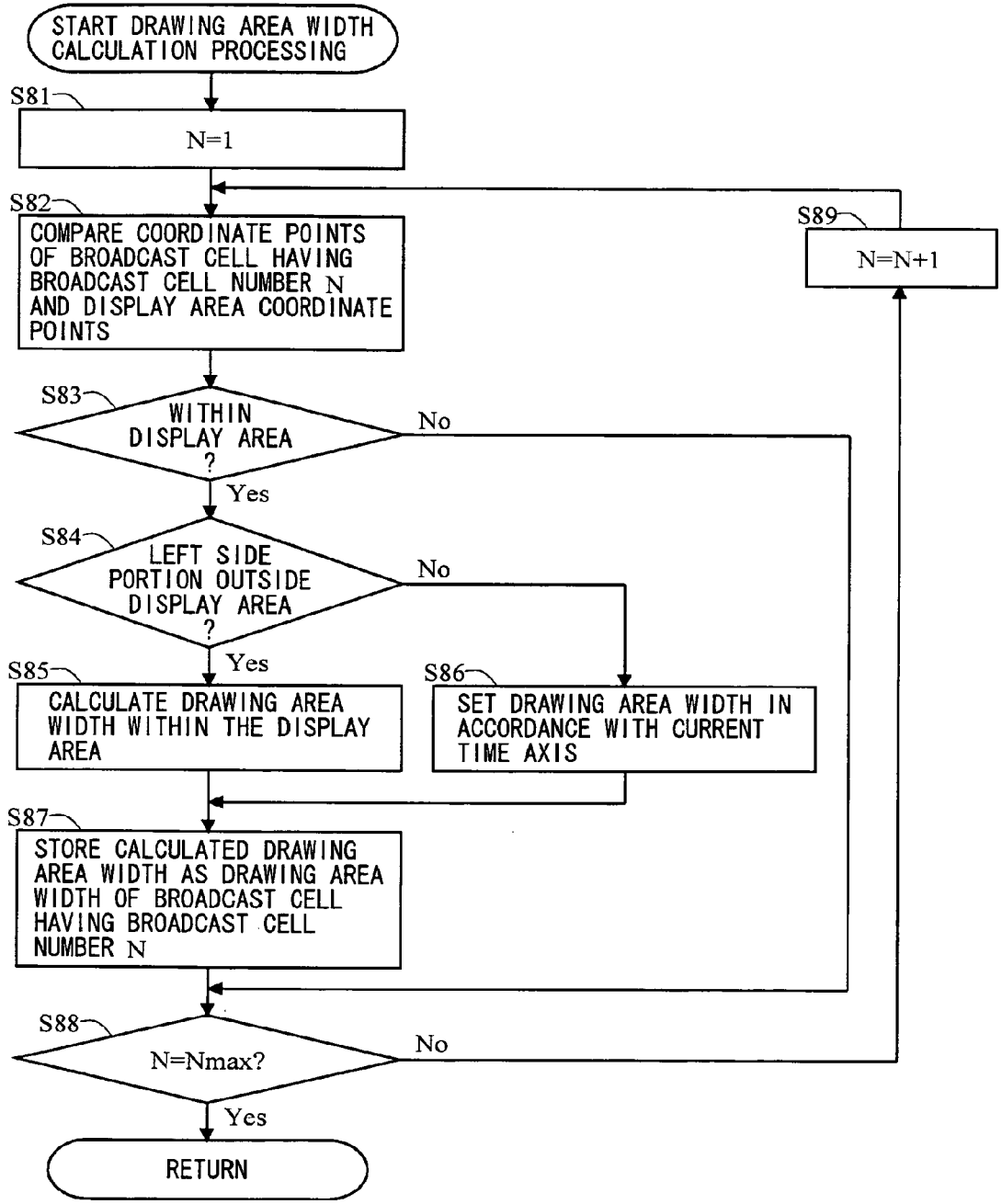
FIG. 17 is a sub-routine showing, in detail, an operation of drawing area width calculation processing in step 57 shown in FIG. 16.
Figure 18:
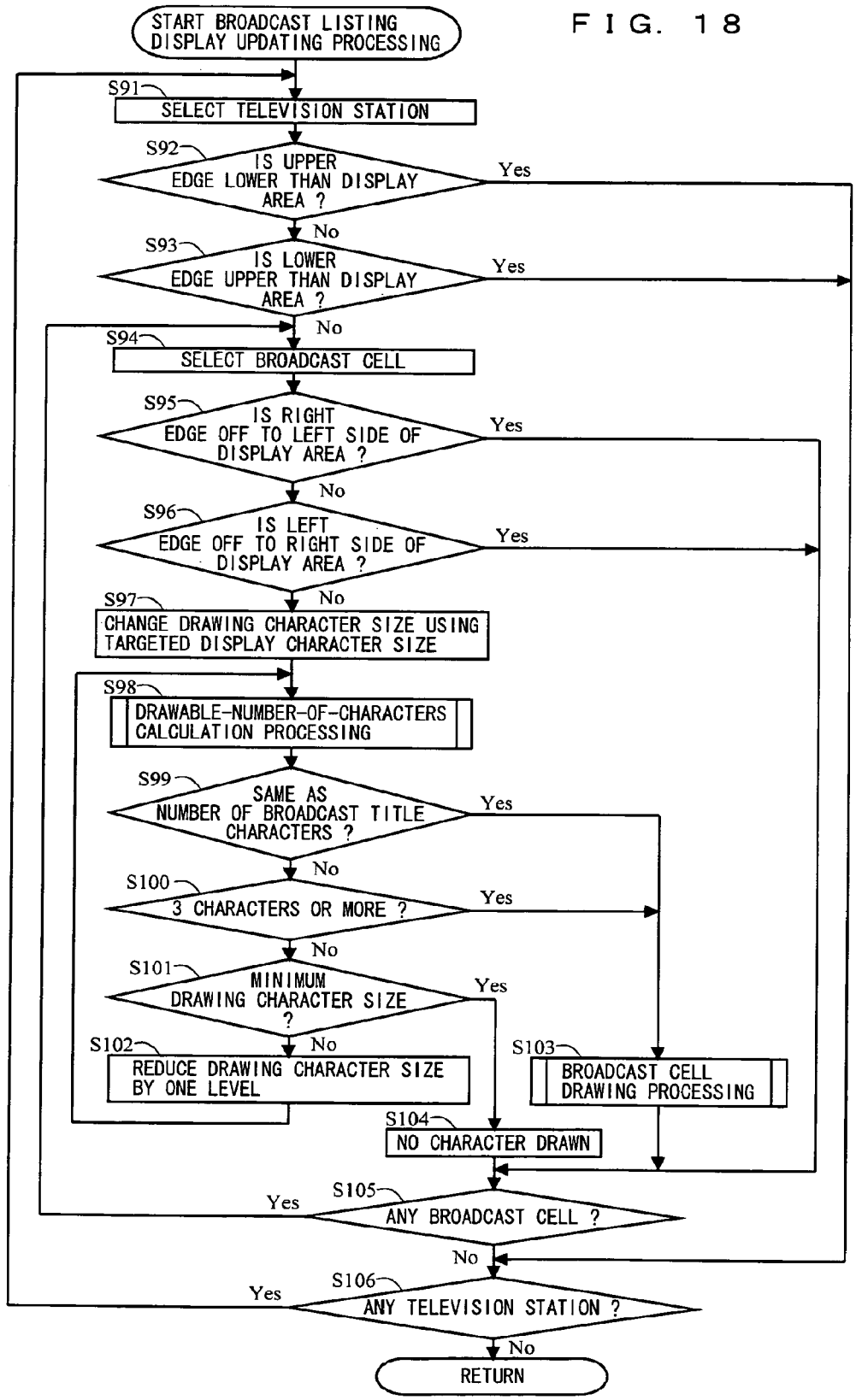
FIG. 18 is a sub-routine showing, in detail, an operation of broadcast listing display updating processing in step 58 shown in FIG. 16.
Figure 19:
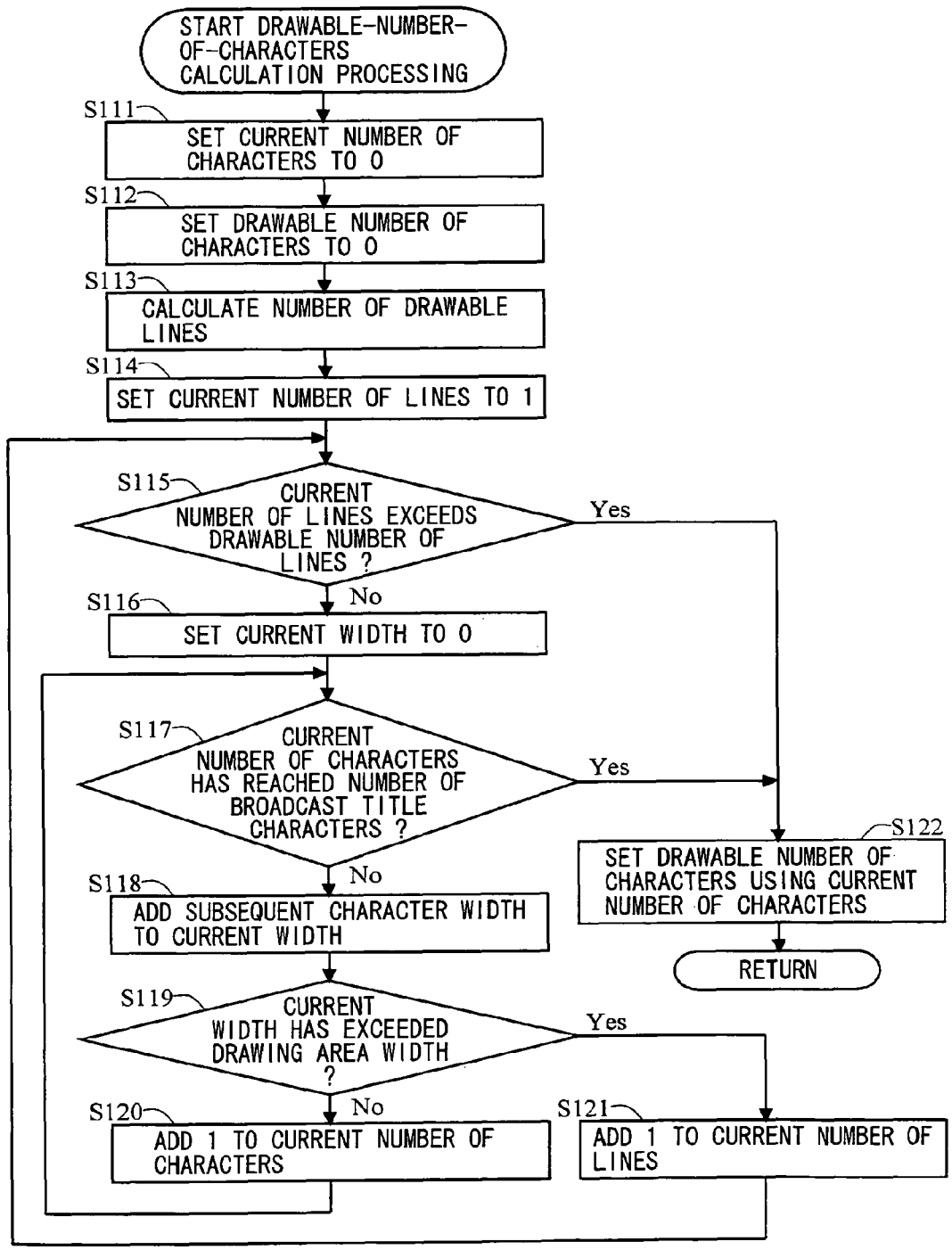
FIG. 19 is a sub-routine showing, in detail, an operation of drawable-number-of-characters calculation processing in step 98 shown in FIG. 18.
Figure 21:
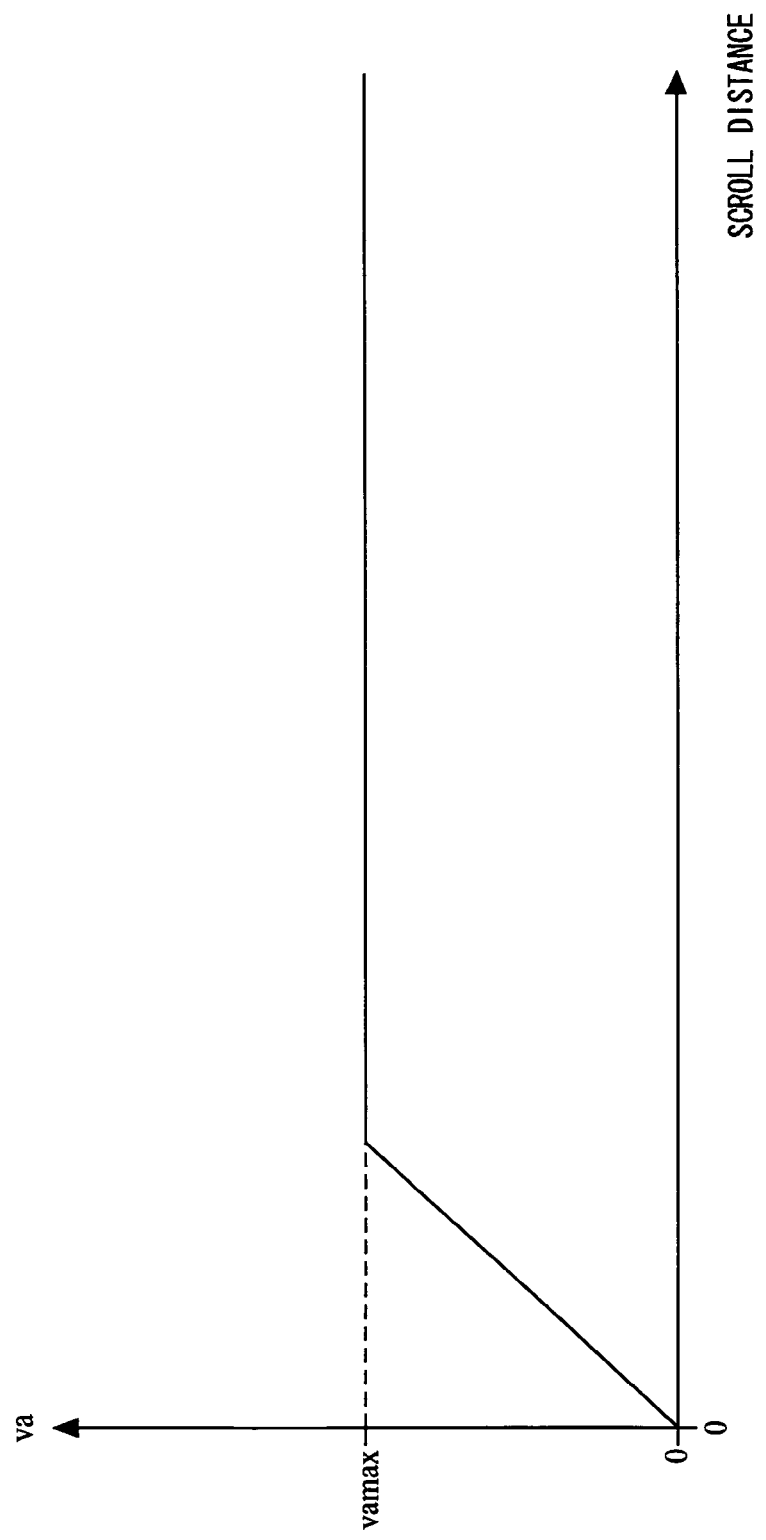
FIG. 21 is a graph illustrating a first exemplary setting of a magnitude va of a scroll vector scv.
Figure 22:
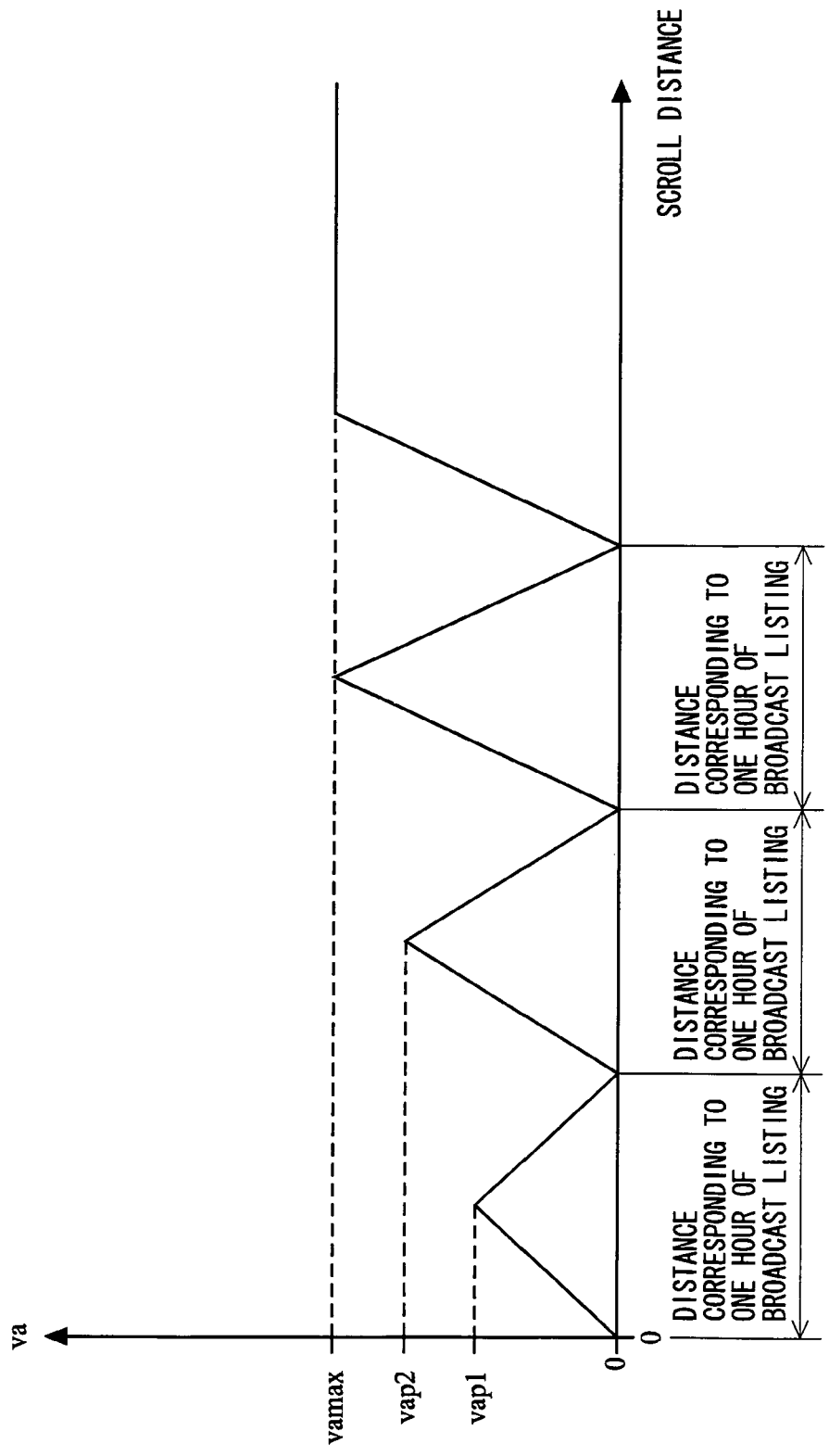
FIG. 22 is a graph illustrating a second exemplary setting of the magnitude va of the scroll vector scv.
Figure 23:
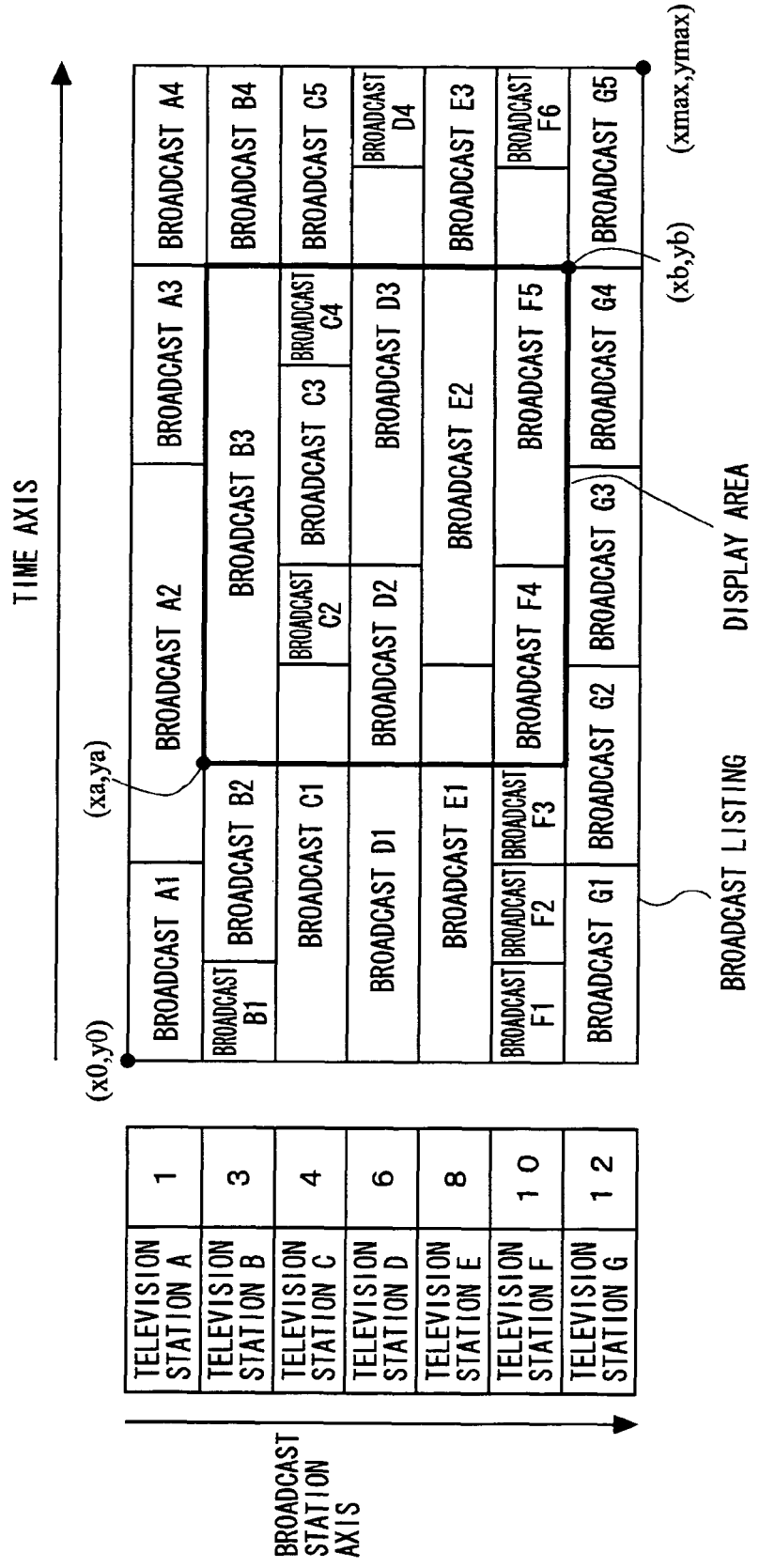
FIG. 23 is a diagram illustrating an exemplary setting of a display area of the broadcast listing.
Figure 24:
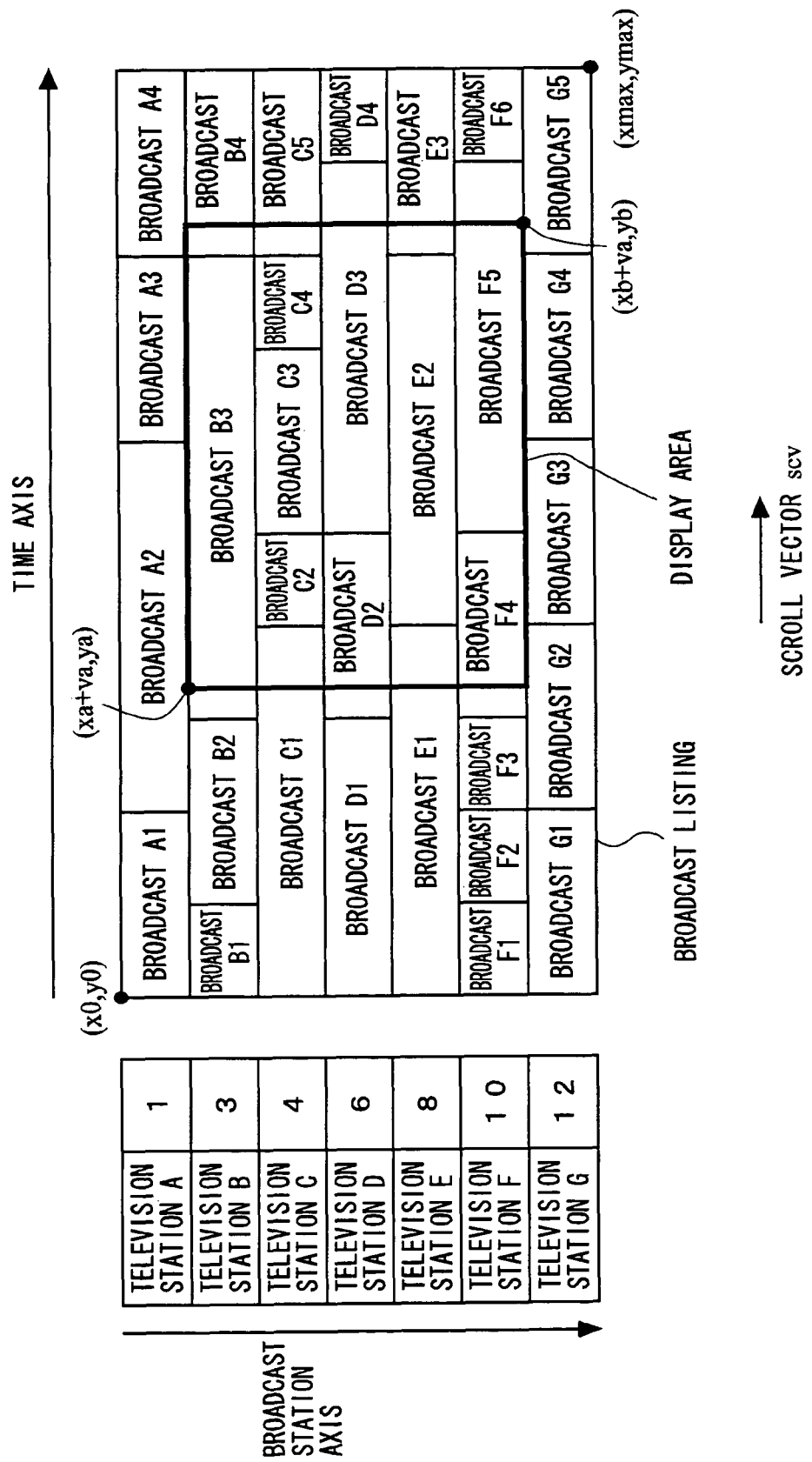
FIG. 24 is a diagram illustrating an exemplary setting of the display area in accordance with a scroll operation.
Figure 25:
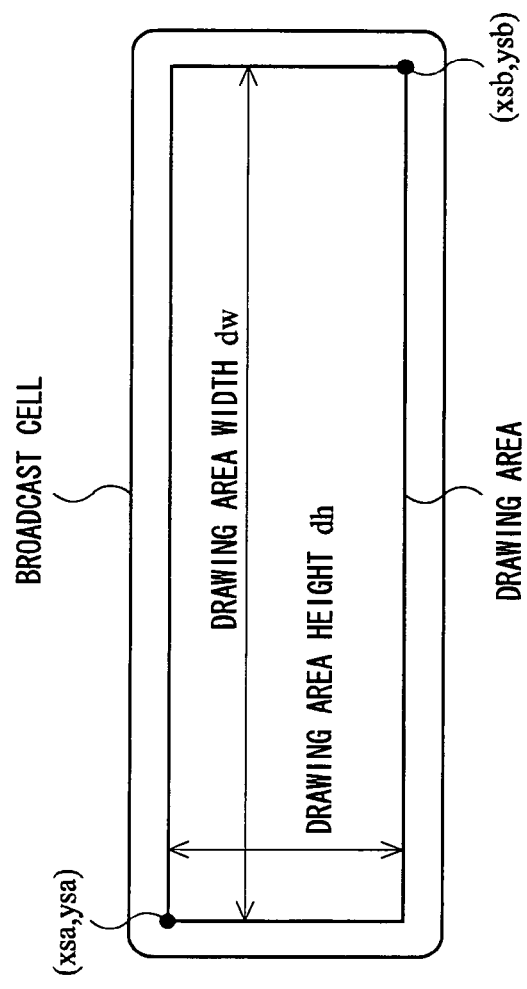
FIG. 25 is a diagram illustrating exemplary settings of a drawing area width dw and a drawing area height dh which are set with respect to a broadcast cell.
Figure 26:
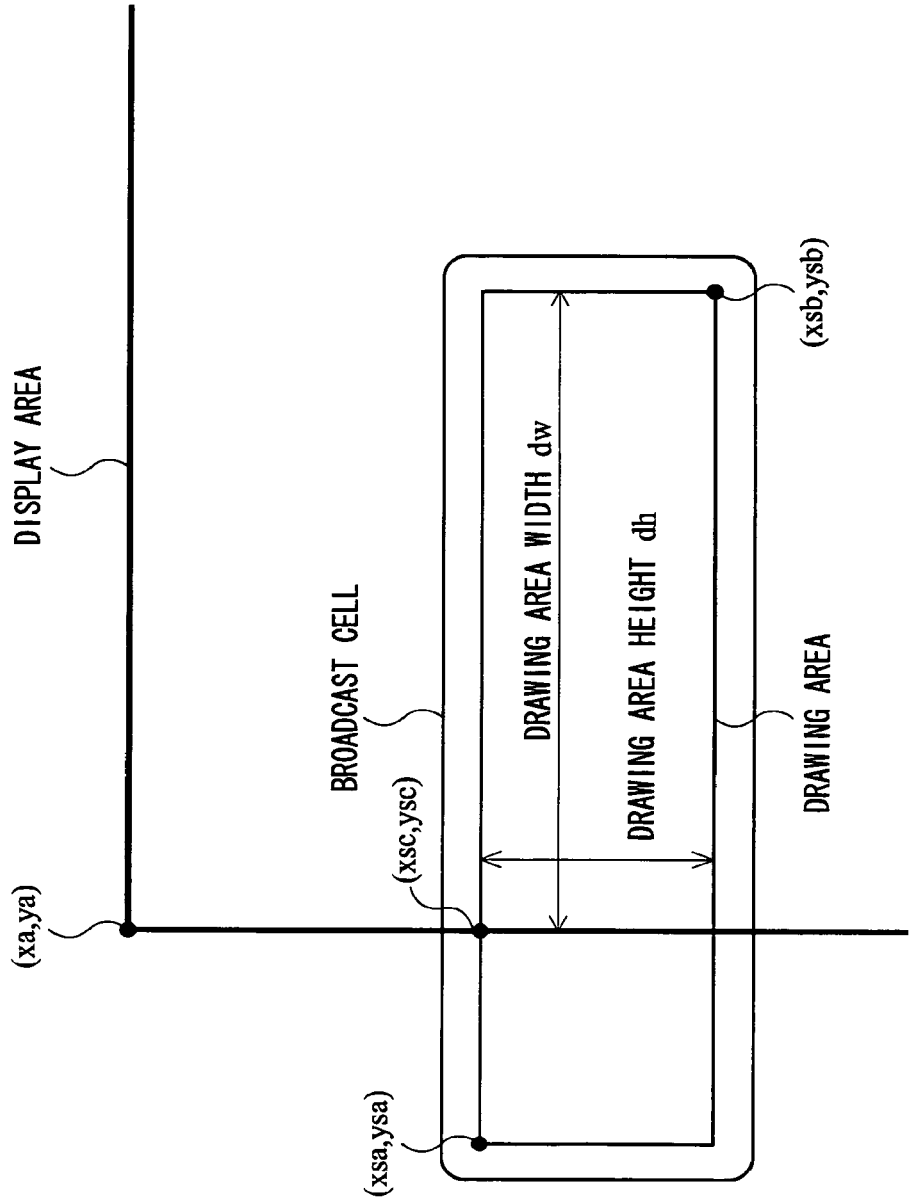
FIG. 26 is a diagram illustrating exemplary settings of the drawing area width dw and the drawing area height dh which are set in the case where a portion of the broadcast cell stays within the display area.

With reference to FIGS. 16 to 26, the display control processing performed on the game apparatus body 5 will be described in detail. FIG. 16 is a flowchart showing an exemplary flow of the display control processing performed on the game apparatus body 5. FIG. 17 is a sub-routine showing, in detail, an operation of the drawing area width calculation processing in step 57 shown in FIG. 16. FIG. 18 is a sub-routine showing, in detail, an operation of the broadcast listing display updating processing in step 58 shown in FIG. 16. FIG. 19 is a sub-routine showing, in detail, an operation of the drawable-number-of-characters calculation processing in step 98 shown in FIG. 18. FIG. 20 is a sub-routine showing, in detail, the broadcast cell drawing processing in step 103 shown in FIG. 18. FIG. 21 is a graph showing a first exemplary setting of a magnitude va of the scroll vector scv. FIG. 22 is a graph showing a second exemplary setting of the magnitude va of the scroll vector scv. FIG. 23 is a diagram illustrating an exemplary setting of the display area of the broadcast listing. FIG. 24 is a diagram illustrating an exemplary setting of the display area in accordance with the scroll operation. FIG. 25 is a diagram showing exemplary settings of the drawing area width dw and the drawing area height dh which are set with respect to each of the broadcast cells. FIG. 26 is a diagram showing exemplary settings of the drawing area width dw, the drawing area height dh, and the drawing start point (xsc, ysc) which are set in the case where a portion of the broadcast cell stays within the display area. In each of the flowcharts shown in FIGS. 16 to 20, among the display control processing, processing of displaying characters in the broadcast cell on the monitor 2 will be mainly described. Description of other processing not directly relating to the present invention will be omitted. As shown in FIGS. 16 to 20, each step executed by the CPU 10 is abbreviated as "S".

When the power button 24 of the game apparatus body 5 is turned on, the CPU 10 of the game apparatus body 5 executes the start-up program stored in the ROM/RTC 13, whereby respective component units such as the main memory are initialized. The display control program stored on the optical disc 4 or another storage medium is read into the main memory, and the CPU 10 causes execution of the display control program to be ready. The flowchart shown in FIG. 16 indicates the display control processing performed after completion of the above-described processing.

As shown in FIG. 16, the CPU 10 performs an initial setting (step 51) and proceeds to the subsequent step. For example, in the initial setting in step 51, various pieces of information descried in the broadcast cell data Db2 is updated to the latest information as appropriate by using the electronic broadcast listing data obtained through communication with various servers connected to the network via the wireless communication module 18 and the antenna 22, and then the initial setting of the broadcast listing is performed. Also in the initial setting in step 51, respective parameters for displaying the broadcast listing are initialized. For example, the CPU 10 sets parameters indicated by respective pieces of data stored in the main memory to default values, respectively.

The CPU 10 performs display processing of the broadcast listing (step 52), and proceeds to the subsequent step. Specifically, the CPU 10 generates the broadcast listing in accordance with a state of the default setting set in step 51, and displays the generated broadcast listing on the monitor 2.

The CPU 10 obtains the operation information received from the controller 7 (step 53), and then proceeds to the subsequent step. The CPU 10 then updates the operation information Da by using the obtained latest operation information. The operation information obtained in step 53 includes key data indicative of how the operation section 72 of the controller 7 is operated, in addition to the process result data indicative of the positions of the markers 81, and 8R on the picked up image. The communication section 75 transmits the operation information to the game apparatus body 5 at a predetermined time interval (e.g., at the interval of 5 ms). The CPU 10 then uses the transmitted latest operation information on a frame-by-frame basis, and updates the first coordinate point data Da1, the second coordinate point data Da2 and key data Da3.

The CPU 10 determines whether or not the user has performed the scroll operation of the broadcast listing (step 54). Specifically, the CPU 10 refers to the first coordinate point data Da1, the second coordinate point data Da2 and key data Da3 which are included in the operation information Da, and determines a content of an operation performed by the user. For example, when the user presses the operation button 72a or the operation button 72i, the CPU 10 determines that the scroll operation of the broadcast listing is performed. When the user performs the scroll operation of the broadcast listing (Yes in step 54), the CPU 10 proceeds to subsequent step 55. On the other hand, the user performs an operation different from the scroll operation of the broadcast listing (No in step 59), the CPU 10 performs another processing in accordance with an operation performed by the user (step 60), and proceeds to subsequent step 58.

In step 55, in accordance with the operation information obtained in step 53, the CPU 10 calculates the scroll vector scv indicative of the scroll speed and the scroll direction corresponding to the operation performed by the user, updates the scroll vector data Db3, and then proceeds to the subsequent step. Hereinafter, an exemplary calculation of the scroll vector scv will be described.

For example, when the user performs the scroll operation by pressing the operation button 72i, the scroll vector scv is calculated in accordance with a position pointed to by the controller 7. In order to calculate the position pointed to by the controller 7, the CPU 10 calculates a direction from a point indicated by the first coordinate point data Da1 to a point indicated by the second coordinate point data Da2, and a middle point between the point indicated by the first coordinate point data Da1 and the point indicated by the second coordinate point data Da2. When the number of target images (markers 8L and 8R) in the picked up image is considered as one, the middle point indicates a position in the one image. In accordance with a difference between the middle point and a predetermined reference point, a change in the position of the image can be calculated, the change being caused by a change in a position of the controller 7 with respect to the monitor 2.

Here, a positional relation among the markers 8L and 8R, the display screen of the monitor 2, and the controller 7 will be considered. For example, a case will be considered where two markers 8L and 8R are located on the top surface of the monitor 2 (see FIG. 1), and the user points the controller 7 to a central part of the display screen of the monitor 2 while orientating the top surface of the controller 7 upward (that is, in a state where the central part of the display screen is located at a central part of the image picked up by the imaging information calculation section 74). In this case, in the image picked up by the imaging information calculation section 74, the middle point of the target image (a middle point between the markers 8L and 8R) does not correspond to the central part of the picked up image. Specifically, the target image is located at a position above the central part of the picked up image. A reference position is set such that the controller 7 points the central part of the display screen when the target image is located at such position. On the other hand, when the position pointed to by the controller 7 is moved, the position of the target image in the picked up image also moves (to the direction opposite to the moving direction of the controller 7). Therefore, processing is performed so as to move the pointed to position on the display screen in accordance with the movement of the position of the target image on the picked up image, whereby it is possible to calculate a position on the display screen pointed to by the controller 7.

In order, to set the reference position, the user may previously points to a predetermined position on the display screen so as to correlate the position of the target image at that time point with the predetermined position and so as to store the correlation. Alternatively, when the positional relation between the target image and the display screen is fixed, the reference position may be set previously. In this manner, the pointed to position on the display screen is calculated based on the linear transformation which uses a function for calculating, from the middle point, a coordinate point on the display screen of the monitor 2. The function converts a value of the coordinate point of the middle point calculated based on a picked up image into a position pointed to by the controller 7 on the display screen when the picked up image is picked up by the controller 7. By using the function, the pointed to position on the display screen can be calculated based on the coordinate point of the middle point. When the user points the controller 7 to the display screen of the monitor 2 while orientating the top surface of the controller 7 toward a direction except for the upward direction (e.g., toward the right direction), the coordinate point of the middle point is corrected by using the direction stored in the direction data Db1, and the pointed to position on the display screen is calculated by using the corrected middle point.

The CPU 10 further converts the calculated pointed to position on the display screen into a position (position-to-be-pointed-to) on the broadcast listing corresponding thereto. For example, the position-to-be-pointed-to on the broadcast listing corresponding to the pointed to position on the display screen is perspectively projected to a position of the broadcast listing displayed on the display screen of the monitor 2. The CPU 10 then sets the direction of the scroll vector scv in accordance with a direction from a scroll reference point on the corresponding broadcast listing (e.g., a central position of the broadcast listing displayed on the monitor 2) to the above-described position-to-be-pointed-to. Further, the CPU 10 sets the magnitude va of the scroll vector scv in accordance with a distance from the scroll reference point to the position-to-be-pointed-to.

With reference to FIG. 21, an exemplary setting of the scroll vector scv will be described in the case where the user performs the scroll operation by continuously pressing the operation button 72i. The CPU 10 sets a maximum value vamax of the magnitude va of the scroll vector scv in accordance with the distance from the scroll reference point to the position-to-be-pointed-to. For example, the CPU 10 sets the maximum value vamax to a larger value when the distance from the scroll reference point to the position-to-be-pointed-to is longer. As shown in FIG. 21, the CPU 10 sets the magnitude va so as to gradually increase from 0 to the maximum value vamax until a moving distance of the broadcast listing caused by scrolling (hereinafter, the moving distance referred to as a scroll distance) reaches a predetermined distance. Thereafter, the maximum value vamax is kept constant. As will become clear later, the scroll vector scv is set in this manner, whereby the broadcast listing is scrolled in accordance with the direction pointed to by the controller 7, and accordingly, the scroll operation can be performed such that when the position pointed to by the controller farther from the scroll reference point, the scroll speed becomes faster.

With reference to FIG. 22, an exemplary setting of the scroll vector scv will be described in the case where the user performs the scroll operation by continuously pressing the operation button 72a (cross key). The CPU 10 sets the maximum value vamax of the magnitude va of the scroll vector scv to a predetermined value. The CPU 10 then sets the direction of the scroll vector scv to any one of upward, downward, right and left directions, in accordance with the direction to which the operation button 72a is pressed. As shown in FIG. 22, when the scroll direction corresponds to the time axis direction of the broadcast listing, the CPU 10 sets the magnitude va to be increased or decreased when the scroll distance reaches a distance corresponding to 30 minutes or one hour of the broadcast listing. Specifically, when the scroll operation starts, the CPU 10 sets the magnitude va to gradually increase from 0 to a first local maximal value vap1, which is lower than the maximum value vamax, until the scroll distance reaches the distance corresponding to 30 minutes of the broadcast listing. The CPU 10 thereafter sets the magnitude va to decrease gradually from the first local maximal value vap1 to 0 until the scroll distance reaches the distance corresponding to one hour of the broadcast listing. Further, the CPU 10 sets the magnitude va to again increase gradually from 0 to a second local maximal value vap2, which is lower than the maximum value vamax, and is greater than the first local maximal value vap1, when the scroll distance changes from the distance corresponding to one hour of the broadcast listing to a distance corresponding to one and a half hour of the broadcast listing. Thereafter, the CPU 10 sets the magnitude va to again decrease gradually from the second local maximal value vap2 to 0 until the scroll distance reaches the distance corresponding to two hours of the broadcast listing. In a similar manner, the CPU 10 gradually increases/decreases the magnitude va such that the maximum value vamax becomes equal to the local maximal value. The CPU 10 sets the magnitude va to increase gradually from 0 to the maximum value vamax, and thereafter the maximum value vamax is kept constant. As will be clear later, by setting the scroll vector scv in this manner, scrolling is performed moderately in accordance with the time unit of the broadcast listing, and the broadcast listing is scroll-displayed in accordance with the direction to which the cross key is pressed.

The CPU 10 then updates the coordinate point of the display area in accordance with the scroll vector scv (step 56), and proceeds to the subsequent step. Specifically, in accordance with the calculated scroll vector scv, coordinate points indicative of the left top corner and the right bottom corner of the display area are calculated, and the display area coordinate point data Db1 is then updated.

Hereinafter, with reference to FIGS. 23 and 24, an exemplary setting of the display area will be described. As shown in FIG. 23, a position arranged based on the coordinate system set on the broadcast listing is set as a position of the display area. For example, the broadcast listing is set such that the vertical axis represents a broadcast station axis, and the horizontal axis represents the time axis. The coordinate system (hereinafter referred to as a broadcast listing coordinate point), in which a position at the left top corner of the broadcast listing represents a coordinate point (x0, y0), and a position at the right bottom corner of the broadcast listing represents a coordinate point (xmax, ymax), is set to the broadcast listing. The display area is arranged at a portion in the broadcast listing. For example, a position at the left top corner (coordinate point (xa, ya)) and a position at the right bottom corner (coordinate point (xb, yb)) of the display area is set on the broadcast listing coordinate system, whereby a location and a size of the display area are determined.

As shown in FIG. 24, in step 56, in accordance with the scroll vector scv set by the user's operation, the position of the left top corner (coordinate point (xa, ya)) and the position of the right bottom corner (coordinate point (xb, yb)) of the display area are moved on the broadcast listing coordinate system, whereby the coordinate points of the display area are updated. For example, when the scroll vector SCV has the magnitude va and points to the right direction of the broadcast listing, the position of the left top corner and the position of the right bottom corner of the display area on the broadcast listing coordinate systemove to a coordinate point (xa+va, ya) and a coordinate point (xb1+va, yb), respectively. In this manner, the display area moves in accordance with the magnitude of the scroll vector scv, which represents the scroll speed, and the direction of the scroll vector scv, which resresents the scroll direction. In other words, the display area moves in accordance with the magnitude va of the scroll vector scv, which is regarded as a moving distance per unit time. Accordingly, the magnitude va of the scroll vector scv corresponds to the scroll speed. Therefore, the display control processing described later is performed in units of dots of display image corresponding to the scroll speed. For example, in the case where the magnitude va of the scroll vector scv is 1 dot of the display image, the display area also moves in units of 1 dot, and the display control processing to be described later is also performed in units of 1 dot.

With reference back to FIG. 16, after processing in step 56, the CPU 10 performs drawing area width calculation processing (step 57), and proceeds to subsequent step 58. Hereinafter, with reference to FIG. 17, the drawing area width calculation processing performed in step 57 will be described.

As shown in FIG. 17, the CPU 10 sets a variable N to 1 (step 81), the variable N indicating the broadcast cell number to be processed, and proceeds to the subsequent step.

The CPU 10 compares the coordinate points of the broadcast cell having the broadcast cell number N with the display area coordinate points (step 82), and determines whether or not the broadcast cell stays within the display area (step 83), and also determines whether or not the left side portion of the broadcast cell falls outside the display area (step 84). When the left side portion of, the broadcast cell having the broadcast cell number N falls outside the display area and the right side portion of the broadcast cell stays within the display area (Yes in step 83, and Yes in step 89), the CPU 10 proceeds to subsequent step 85. When the whole portion of the broadcast cell having the broadcast cell number N stays within the display area, or when the right side portion of the broadcast cell having the broadcast cell number N falls outside the display area and the left side portion of the broadcast cell stays within the display area (Yes in step 83, and No in step 84), the CPU 10 proceeds to subsequent step 86. When the whole portion of the broadcast cell having the broadcast cell number N falls outside the display area (No in step 83), the CPU 10 proceeds to subsequent step 88.

For example, as shown in FIG. 25, a rectangular drawing area is set within the broadcast cell. A size of the drawing area is defined by a drawing area width dw and a drawing area height dh. The position of the broadcast cell is defined by a left top corner position (coordinate point (xsa, ysa)) and a right bottom corner position (coordinate point (xsb, ysb)) of the drawing area, which are based on the broadcast listing coordinate system, and data indicative of the coordinate points is stored in the broadcast cell coordinate point data Db2e. In above-described step 83 and step 84, the CPU 10 refers to the broadcast cell coordinate point data Db2e and display area coordinate point data Db1 of the broadcast cell number N, and then obtains the let top corner coordinate point (xsa, ysa) and the right bottom corner coordinate point (xsb, ysb) of the broadcast cell having the broadcast cell number N, and the left top corner coordinate point (xa, ya) and the right bottom corner coordinate point (xb, yb) of the display area. Accordingly, by using the coordinate points, the positional relation between the broadcast cell having the broadcast cell number N and the display area is analyzed.

In step 85, the CPU 10 calculates a portion of the drawing area width dw of the broadcast cell having broadcast cell number N, the portion of the drawing area width dw staying within the display area, and proceeds to subsequent step 87. For example, as shown in FIG. 26, when the left side portion of the broadcast cell falls outside the display area, a width from the left edge of the display area to a right edge of the drawing area of the broadcast cell is calculated as the drawing area width dw.

In step 86, the CPU 10 uses the drawing area width dw corresponding to the time axis currently being set, and sets the drawing area width dw of the broadcast cell having the broadcast cell number N. The CPU 10 then proceeds to subsequent step 87. For example, when the default value set in step 51 or the time axis is changed, the CPU 10 sets the drawing area width dw of the broadcast cell having the broadcast cell number N in accordance with the time axis currently being set. In step 86, when a state in which a portion of the drawing area of the broadcast cell having the broadcast cell number N falls outside the display area is changed to a state in which the whole portion of the drawing area stays within the display area, the drawing area width dw needs to be changed. In the case of other states than this, the drawing area width dw is not changed and is kept constant. Accordingly, in the case where the drawing area width dw is constant, processing in step 86 may be omitted. In this case, only when the state in which the portion of the drawing area in the broadcast cell having the broadcast cell number N falls outside the display area is changed to the state in which the whole of the drawing area stays within the display area, above-described step 86 is performed.

In step 87, the CPU 10 uses the drawing area width dw calculated in step 85 or the drawing area width dw set in step 86, and updates the drawing area width data Db2f of the broadcast cell number N. The CPU 10 then proceeds to subsequent step 88.

In step 88, the CPU 10 determines that the current variable N represents the last number (Nmax) of serial numbers which are written in the broadcast cell data Db2 and which are provided to the respective broadcast cells. In the case of N<Nmax, the CPU 10 adds 1 to the current variable N (step 89), and repeats the processing after returning back to step 82. On the other hand, in the case of N=Nmax, the CPU 10 terminates the processing in the sub-routine.

With reference back to FIG. 16, after processing in step 57 or step 60, the CPU 10 performs broadcast listing display updating processing (step 58), and proceeds to subsequent step 59. Hereinafter, with reference to FIG. 18, the broadcast listing display updating processing performed in step 58 will be described.

As shown in FIG. 18, the CPU 10 selects any one of the television stations (see FIG. 23) displayed in line respectively along the time axis of the broadcast listing (step 91). The CPU 10 determines whether or not a top edge of a display range of the selected television station is lower than the display area (step 92), and also determines whether or not a bottom edge of the display range of the selected television station is higher than the display area (step 93). When at least a portion of the display range of the selected television station stays within the display area (No in steps 92 and 93), the CPU 10 proceeds to subsequent step 94. On the other hand, when the whole portion of the display range of the selected television station falls outside the display area (Yes in step 92 or in step 92), the CPU 10 proceeds to subsequent step 106. For example, with regard to television stations B, C, D, E and F shown in FIG. 23, at least a portion of the display range of each of the television stations stays within the display area. On the other hand, with regard to television stations A and G, the whole portion of the display range of each of the television stations falls outside the display area.

In step 94, the CPU 10 selects any one of the broadcast cells included in the television station currently selected. The CPU 10 determines whether or not a right edge of a drawing range of the selected broadcast cell is located to the left of the display area (step 95), and also determines whether or not a left edge of the drawing range of the selected broadcast cell is located to the right of the display area (step 96). When at least a portion of the drawing range of the selected broadcast cell stays within the display area (No in steps 95 and 96), the CPU 10 proceeds to subsequent step 97. On the other hand, the whole portion of the drawing range of the selected broadcast cell falls outside the display area (Yes in step 95 or step 96), the CPU 10 proceeds to subsequent step 105. For example, when the television station C shown in FIG. 23 is selected, at least portions of the drawing ranges of broadcasts C1, C2, C3 and C4, respectively, stay within the display area. On the other hand, the whole portion of the drawing range of a broadcast cell C5 falls outside the display area.

In step 97, the CPU 10 changes the drawing character size of the broadcast cell currently selected by using the currently targeted display character size, and, proceeds to the subsequent step. Specifically, the CPU 10 refers to the targeted display character size data Db4 so as to obtain the targeted display character size, and updates the drawing character size data Db2h of the broadcast cell currently selected by using the targeted display character size.

The CPU 10 then performs the drawable-number-of-characters calculation processing (step 98), and proceeds to the subsequent step. Hereinafter, with reference to FIG. 19, an operation of the drawable-number-of-characters calculation processing will be described in detail.

As shown in FIG. 19, the CPU 10 sets the current number of characters to 0 (step 111), and also sets the drawable number of characters to 0 (step 112). The CPU 10 calculates the number of character lines drawable in the drawing area of the currently selected broadcast cell (step 113). The CPU 10 sets a current number of lines to 1 (step 114), and proceeds to the subsequent step. For example, in step 113, the CPU 10 refers to the drawing area height data Db2g of the currently selected broadcast cell, and obtains the drawing area height dh. The CPU 10 refers to the drawing character size data Db2h of the currently selected broadcast cell, and obtains the drawing character size. The CPU 10 then calculates the drawable number of character lines by dividing the obtained drawing area height dh by a line height previously set to the obtained drawing character size, thereby updating the drawable-number-of-lines data Db2i of the currently selected broadcast cell.

The CPU 10 determines whether or not the current number of lines exceeds the number of character lines drawable in the currently selected broadcast cell (step 115). For example, the CPU 10 refers to the drawable-number-of-lines data Db2i of the currently selected broadcast cell so as to obtain the drawable number of character lines, and determines whether or not the current number of lines exceeds the drawable number of character lines. When the current number of lines does not exceed the number of character lines drawable in the currently selected broadcast cell, the CPU 10 proceeds to subsequent step 116. On the other hand, when the current number of lines exceeds the number of character lines drawable in the currently selected broadcast cell; the CPU 10 proceeds to subsequent step 122.

In step 116, the CPU 10 sets a current width to 0. The CPU 10 then determines whether or not the current number of characters reaches the number of characters of a broadcast title described in the currently selected broadcast cell (step 117). For example, the CPU 10 refers to the number-of-broadcast-title-characters data Db2c of the currently selected broadcast cell so as to obtain the number of characters of the broadcast title, and determines whether or not the current number of characters reaches the number of characters of the broadcast title. When the current number of characters does not reach the number of characters of the broadcast title described in the currently selected broadcast cell, the CPU 10 proceeds to subsequent step 118. On the other hand, when the current number of characters reaches the number of characters of the broadcast title described in the currently selected broadcast cell, the CPU 10 proceeds to subsequent step 122.

In step 118, the CPU 10 adds a width of a subsequent character to the current with. Then the CPU 10 determines whether or not the current width having been added has exceeded a width of the drawing area (step 119). That is, the CPU 10 determines whether or not the current number of characters having been added exceeds the number of characters drawable in the current lines. For example, the CPU 10 refers to the drawing area width data Db2f of the currently selected broadcast cell, and obtains the drawing area width dw. The CPU 10 compares the obtained drawing area width dw with the current width, and determines whether or not the current width having been added exceeds the width of the drawing area. When the current width having been added does not exceed the width of the drawing area, the CPU 10 adds 1 to the current number of characters (step 120), and repeats the processing after returning back to step 117. On the other hand, when the current width having been added exceeds the width of the drawing area, the CPU 10 adds 1 to the current number of lines (step 121), and repeats the processing after returning back to step 115. In this manner, the number of characters drawable in the respective lines in the currently selected broadcast cell is calculated on a line-by-line basis.

Here, the width of the subsequent character explained in step 118 represents a width of a character to be described subsequent to characters which are counted as the current number of characters already described in the currently selected broadcast cell as a part of the broadcast title characters. For example, when the current number of characters is "2" in exemplary broadcast cell data Db2 shown in FIG. 15, the character width of a character "C" described subsequently is regarded as the subsequent character width. Generally, in most cases, the character width varies even if the character size and a font style are constant. For example, in above-described step 118, font data previously set in the game apparatus body 5 is referred to, and then the character widths for respective character types are obtained. Therefore, the number of characters drawable in each of the lines in the broadcast cell varies, from one line to another.

When it is determined Yes in step 115, or when it is determined Yes in step 117, the CPU 10 sets the number of characters drawable in the currently selected broadcast cell by using the current number of characters (step 122), and terminates the processing in the sub-routine. For example, the CPU 10 updates the drawable-number-of-characters data Db2i of the currently selected broadcast cell by using the current number of characters. When it is determined Yes in step 115, the current number of lines exceeds the number of lines drawable in the currently selected broadcast cell. That is, the number of characters exceeding the current number of characters cannot be drawn in the drawing area of the currently selected broadcast cell. On the other hand, when it is determined Yes in step 117, the current number of characters reaches the number of characters of the broadcast title described in the currently selected broadcast cell. That is, there are no more characters than the current number of characters to be described in the drawing area of the currently selected broadcast cell. In this manner, in the drawable-number-of-characters calculation processing, the drawing character size set to the broadcast cell is used as a reference, and when the number of characters described in the broadcast cell reaches a maximum number of characters drawable in the broadcast cell or reaches the number of the characters of the broadcast title to be described, the CPU 10 calculates and considers either of the numbers of characters as the drawable number of characters.

With reference back to FIG. 18, after the drawable-number-of-characters calculation processing in step 98, the CPU 10 determines whether or not the number of characters drawable in the currently selected broadcast cell is the same as the number of characters of, the broadcast title (step 99). For example, the CPU 10 refers to the number-of-broadcast-title-characters data Db2c and drawable-number-of-characters data Db2j of the currently selected broadcast cell so as to obtain the number of characters of the broadcast title and the drawable number of characters, and determines whether or not the drawable number of characters and the number of characters of the broadcast title having been obtained are equal to each other. When the drawable number of characters is different from the number of characters of the broadcast title, the CPU 10 proceeds to subsequent step 100. On the other hand, when the drawable number of characters is equal to the number of characters of the broadcast title, the CPU 10 proceeds to subsequent step 103.

In step 100, the CPU 10 determines whether or not the number of characters drawable in the currently selected broadcast cell is three or more. For example, the CPU 10 refers to the drawable-number-of-characters data Db2*j* of the currently selected broadcast cell so as to obtain the drawable number of characters, and determines whether or not the obtained number of characters is three or more. When the drawable number of characters is two or lower, the CPU 10 proceeds to subsequent step 101. On the other hand, when the drawable number of characters is three or more, the CPU 10 proceeds to subsequent step 103.

In step 101, the CPU 10 determines whether or not the drawing character size applied to the currently selected broadcast cell is a minimum size. For example, the CPU 10 refers to the drawing character size data Db2*h* of the currently selected broadcast cell so as to obtain the drawing character size, and determines whether or not the obtained drawing character size is the minimum character size (e.g., the "extra small" character size). When the drawing character size is not the minimum character size, the CPU 10 sets the drawing character size smaller by one level and updates the drawing character size data Db2*h* of the currently selected broadcast cell (step 102). The CPU 10 then returns back to step 98 and repeats the processing. On the other hand, when the drawing character size is the minimum size, the CPU 10 proceeds to subsequent step 104.

In step 103, the CPU 10 performs the broadcast cell drawing processing, and proceeds to subsequent step 105. Hereinafter, with reference to FIG. 20, an operation of the broadcast cell drawing processing will be described in detail.

As shown in FIG. 20, the CPU 10 compares the broadcast cell coordinate points of the currently selected broadcast cell with the display area coordinate points, and determines whether or not the left side portion of the broadcast cell falls outside the display area (step 131). When the whole portion of the currently selected broadcast cell stays within the display area, or when the right side portion of the broadcast cell falls outside the display area and the left side portion of the broadcast cell stays within the display area, the CPU 10 proceeds to subsequent step 132. On the other hand, when the left side portion of the currently selected broadcast cell falls outside the display area (that is, the right side portion of the broadcast cell stays within the display area), the CPU 10 proceeds to subsequent step 133. In above-described step 131, the CPU 10 refers to the broadcast cell coordinate point data Db2*e* and the display area coordinate point data Db1 of the currently selected broadcast cell, and obtains the left top corner coordinate point (xsa, ysa) and the right bottom corner coordinate point (xsb, ysb) of the broadcast cell, and the left top corner coordinate point (xa, ya) and the right bottom corner coordinate point (xb, yb) of the display area. By using the coordinate points, the CPU 10 analyzes the positional relation between the broadcast cell and the display area.

In step 132, the CPU 10 arranges and draws, from the left edge of the drawing area of the currently selected broadcast cell, characters with the drawable number of characters in the set drawable character size, and terminates the processing in the sub-routine. For example, the CPU 10 refers to the broadcast cell data Db2 of the currently selected broadcast cell, and horizontally arranges and draws, from the left edge of the drawing area of the broadcast cell, a character string with the drawable number of characters in a set drawing character size, the character string constituting a broadcast title in the broadcast cell. When the drawable number of characters is set with respect to a plurality of lines in the drawing area of the broadcast cell, the character string of the broadcast title is arranged and drawn by using the plurality of lines in the drawing area. In this manner, the left edge of the drawing area of the broadcast cell functions as a drawing start point, and when the drawing start point is arranged within the display area, the broadcast title is described from the drawing start point (that is, the left edge of the drawing area).

On the other hand, in step 133, the CPU 10 sets the drawing start point to a left top corner position of an area which is a portion of the drawing area of the broadcast cell and which stays within the display area, updates the drawing start point data Db2*k* of the broadcast cell, and then proceeds to the subsequent step. For example, the CPU 10 refers to the broadcast cell coordinate point data Db2*e* of the currently selected broadcast cell and the display area coordinate point data Db1, and obtains the left top corner coordinate point (xsa, ysa) and the right bottom corner coordinate point (xsb, ysb) of the currently selected broadcast cell, and the left top corner coordinate point (xa, ya) and the right bottom corner coordinate point (xb, yb) of the display area. The CPU 10 then calculates the drawing start point (xsc, ysc) by using these coordinates points. Specifically, when the broadcast cell and display area are in a positional relation as shown in FIG. 26, a time axis coordinate value (horizontal coordinate) of the drawing start point corresponds to a time axis coordinate value of the left top corner coordinate point of the display area, and a broadcast station axis coordinate value (vertical coordinate) of the drawing start point corresponds to a broadcast station axis coordinate value of the left top corner coordinate point of the broadcast cell. That is, the drawing start point (xsc, ysc) is set as follows.

xsc←xa ysc←ysa

The CPU 10 arranges and draws, from the drawing start point set in step 133 (step 134) in the portion of the drawing area staying within the display range, characters with the drawable number of characters in the set drawing character size, and terminates the processing in the sub-routine. For example, the CPU 10 refers to the broadcast cell data Db2 of the currently selected broadcast cell, and horizontally arranges and draws the character string with the drawable number of characters in the set drawing character size, the character string constituting the broadcast title in selected broadcast cell, from the drawing start point of the drawing area of the broadcast cell, the drawing area staying within the display area. In this case, since a portion of the drawing area falls outside the display area, the CPU 10 arranges and draws the character string constituting the broadcast title by using a limited portion of the drawing area, the limited portion staying within the display area. When the drawable number of characters is set with respect to the plurality of lines in the drawing area of the broadcast cell, the character string of the broadcast title is arranged and drawn by using the plurality of lines in the drawing area. In this manner, when the left edge of the drawing area which functions as the drawing start point is arranged outside the display area, the drawing start point is moved to a position within the display area (that is, moved to the coordinate point (xsc, ysc)), and the broadcast title is drawn from the moved drawing start point.

With reference back to FIG. 18, when it is determined in step 101 that the drawing character size is the minimum size, the CPU 10 does not draw any character in the drawing area of the selected broadcast cell (that is, keeps the drawing area blank) (step 104), and proceeds to subsequent step 105. That is, when three or more characters cannot be drawn in a broadcast cell even if the minimum size is applied as the drawing character size, the broadcast cell is kept blank.

In step 105, the CPU 10 determines whether or not there is any broadcast cell which is yet to be processed in the television station currently selected. When there is a broadcast cell which is yet to be processed in the television station currently selected, 10, the CPU 10 returns to step 94 and repeats the processing. On the other hand, where there is no broadcast cell which is yet to be processed in the television station currently selected, the CPU 10 proceeds to subsequent step 106.

In step 106, the CPU 10 determines whether or not there is any television station which is yet to be processed in the broadcast listing. When there is a television station yet to be processed in the broadcast listing, the CPU 10 returns to step 91 and repeats the processing. On the other hand, when all the television stations in the broadcast listing have been processed, the CPU 10 terminates the processing in the subroutine.

With reference back to FIG. 16, after processing in step 58, the CPU 10 determines whether or not a display of the broadcast listing is terminated (step 59). As a condition for terminating the display, for example, when the condition for terminating the display of the broadcast listing is satisfied, or when the user performs an operation for terminating the display of the broadcast, the display is terminated. When the display is not terminated, the CPU 10 returns to step 53 and repeats the processing. When the display is terminated, the CPU 10 terminates the processing in the flowchart.

In this manner, the game apparatus body 5 executing the display control program according to the present embodiment is capable of allowing the user to understand information easily at the time of the scroll operation and also capable of improving viewability of display information. For example, when a broadcast listing is scroll-displayed, and consequently, a portion of a broadcast title described in a broadcast cell falls outside a display range, the broadcast title is moved so as to be displayed within the display range. Therefore, it is possible for the user to understand information easily even if the scroll operation is performed, and is also possible to improve viewability of the broadcast listing. Further, when the broadcast listing is scroll-displayed, in accordance with the size of the drawing area of each broadcast cell located at the left edge of the broadcast listing and in accordance with the character size to be drawn in the drawing area, the number of characters drawable in the drawing area is calculated, and the character size to be drawn in the drawing area is determined in accordance with the drawable number of characters. Accordingly, it is possible to improve the viewability of the broadcast listing. Further, movement of the display position of the broadcast title and a change in the character size, which are caused by the scroll operation, are performed at processing intervals. Therefore, the broadcast listing can be scroll-displayed smoothly in units smaller than broadcast cell units. Accordingly, it is possible to improve understandability and viewability of the information at the time of the scroll operation.

The above description is exemplified by an example where the character size for describing the broadcast title has four levels ("large", "medium, "small" and "extra small"). However, the character size is not necessarily set to have the four levels. For example, the broadcast title may be described by using the character size having two or three levels, or the broadcast title may be described by using the character size having five or more levels.

In the above description, a rule is set such that at least three characters of the broadcast title is to be described in each of the broadcast cells. However, another type of rule may be applicable. For example, the minimum number of characters to be described in the broadcast cell may be determined by the user.

Further, the character size set as the targeted display character size data Db4 is described as the currently targeted display character size. The character size set as the targeted display character size data Db4 may be changeable in accordance with the operation performed by the user. Further, the character size set as the targeted display character size data Db4 may be changed in accordance with a size of the broadcast listing to be displayed and a length of the time axis to be displayed.

Further, in the drawing area width calculation processing in step 57, when the left side portion of the drawing area falls outside the display area (see FIG. 26), the drawing area width dw is reset with respect to the width direction of the drawing area. In this case, when the left side portion of the drawing area falls outside the display area due to the scroll operation, the broadcast title is drawn by using a limited portion of the drawing area, the limited portion staying within the display area. When the right side portion of the drawing area falls outside the display area due to the scroll operation, the broadcast title is drawn by using the drawing area including the right side portion which falls outside the display area (that is, there is no limitation in the drawing area). In the processing, when a portion of the drawing area goes off the left or right of the display area, the drawing area width dw may be reset. When a portion of the drawing area goes off the right of the display area, in step 133, a drawing stop point is set at the right bottom corner position of an area in the drawing area of the broadcast cell, the area staying within the display area. A character string with the drawable number of characters is then arranged and drawn in the set drawing character size in the drawing area in a display range to the set drawing stop point.

The above description is exemplified by a case where the scrolling is performed in the right-left direction, however, the scrolling may be performed in an up-down direction. For example, in the drawing area width calculation processing in step 57, when a portion of the drawing area falls outside the display area, the drawing area height dh is reset with respect to a height direction of the drawing area. Accordingly, when the portion of the drawing area goes off the top of the display area, the drawing area height dh is reset. When a top edge of the drawing area falls outside the display area, the reset top edge of the drawing area, the reset top edge staying within the display area, is set as the drawing start point, and a broadcast title is drawn in the limited drawing area which stays within the display area. In a similar manner, when the scrolling is performed in the up-down direction, and when a portion of the drawing area goes off the bottom of the display area, a reset bottom edge of the drawing area, the reset bottom edge staying within the display area, is set as the drawing stop point. Accordingly, the broadcast title is drawn in the limited drawing area which stays within the display area.

As is clear from the above-described processing procedure, the display range of the broadcast listing changes continuously in units of magnitude va of the scroll vector scv until an amount of scrolling reaches such amount which is desired by the user. According to the change, the display mode of the broadcast title drawn in the broadcast cell also changes continuously in units of a length corresponding to the unit of the magnitude va. Therefore, the magnitude va is set shorter than a length of the broadcast cell, whereby the display range of the broadcast listing and the display mode of the broadcast title can be changed continuously at an interval of a unit time, in units of the length shorter than the length of the broadcast cell. Further, when the magnitude va is set at 1 dot of the display image, it is obvious that scroll display processing can be performed, where very minute 1 dot is set as a unit of movement.

The above description is exemplified by a case where the display area is moved toward the direction of scrolling performed by the user, whereby the broadcast cell to be displayed is scrolled in a direction opposite to the direction of scrolling. However, the broadcast cell may be scrolled in another direction. For example, by moving the display area to a direction opposite to the direction of scrolling performed by the user, the broadcast cell to be displayed may be scrolled in the same direction as the scroll operation.

Further, a priority order is set to each of the characters of the character string which is indicated by the broadcast title character string data Db2b and which is described in the broadcast cell, and the characters may be displayed in order of the priority when all the characters of the broadcast title cannot be described. Accordingly, when characters which are likely to be redundant with those of another broadcast title are assigned relatively low priority, it is possible to distinguish the broadcast title with another broadcast title even though only a few characters of the broadcast title is displayed.

In the above description, the broadcast listing in the matrix form is applied, in which the horizontal axis represents the time axis, and the vertical axis represents the broadcast station axis. However, a broadcast listing in another form may be applied. For example, a broadcast listing in the matrix from, in which the horizontal axis represents the broadcast station axis and the vertical axis represents the time axis, may be applied to the present invention. In this case, whether or not a portion of the drawing area of the broadcast cell falls outside the display area is determined with reference to a vertical direction (height) of the drawing area, whereby a similar display control processing can be realized.

The above description is exemplified by a two-dimensional broadcast listing which is arranged in a two-dimensional virtual world. However, it is obvious that a display control of a broadcast listing arranged in a three-dimensional virtual world is also feasible.

The above description is exemplified by the display control of the character string described in each of the broadcast cells in the broadcast listing in the matrix form, in which the horizontal axis represents the broadcast station axis and the vertical axis represents the time axis. However, it is possible to perform the display control of a character string described in a mode different from that used for the broadcast listing. For example, it may be possible to perform the display control of character strings described in respective cells of a game schedule in the matrix form, in which one axis represents a type of a game and the other axis represents the time axis. Further, it may be possible to perform the display control of character strings described in respective cells of a schedule in a matrix form, in which any two of the time axis, a date axis, a day-of-the-week axis, a user axis and the like are used as axes thereof. Further, it may be possible to perform the display control of character strings described in respective cells of a chart in a matrix form having a plurality of rows and columns. In this manner, the present invention is applicable to any character string described in respective cells in a chart form as well as the broadcast listing, and obviously, in this case as well, an effect similar to that exerted in the case of the broadcast listing can be obtained.

A mode has been described in which the image data picked up by the image pickup element 743 is analyzed so as to obtain a position coordinate points of the infrared radiations from the markers 8L and 8R and barycentric coordinate points thereof, and then the processing result data thereof is generated within the controller 7 and transmitted to the game apparatus body 5. However, another processing stage data may be transmitted from the controller 7 to the game apparatus body 5. For example, the image data picked up by the image pickup element 743 is transmitted from the controller 7 to the game apparatus body 5, and the CPU 10 performs the above-described analysis processing so as to obtain the processing result data. In this case, the image processing circuit 744 provided to the controller 7 is not required. Further, partially analyzed image data may be transmitted from the controller 7 to the game apparatus body 5. For example, data indicative of brightness, a position, an area and the like, which are obtained from the image data, is transmitted from the controller 7 to the game apparatus body 5, and the CPU 10 performs remaining analysis processing so as to obtain the processing result data.

In the above description, the infrared radiations from the markers 8L and 8R are used as the imaging targets of the imaging information calculation section 74 of the controller 7. However, another material may be used as the imaging target. For example, one marker or three or more markers are placed in the vicinity of the monitor 2, and the infrared radiations from the markers may be used as the imaging targets of the imaging information calculation section 74. Further, the display screen of the monitor 2 and another luminous element (such as interior light) may be used as the imaging target of the imaging information calculation section 74. As long as a position on the display screen pointed to by the controller 7 is calculated based on the positional relation between the imaging target and the display screen of the monitor 2, any luminous element can be used as the imaging target of the imaging information calculation section 74.

The above description is exemplified by a mode in which the controller 7 and the game apparatus body 5 are connected to each other via the wireless communication. However, the controller 7 and the game apparatus body 5 may be electrically connected to each other via a cable. In this case, the cable connected to the controller 7 is connected to a connection terminal of the game apparatus body 5.

Further, it is obvious that the above-described shape of the controller, the shapes, the number, the positions and the like of the operation sections 72 provided thereto, respective equations, constants, processing orders and the like which are used in the display control processing are merely examples. Any other shapes, numbers, equations, constants, and processing orders may be used to realize the present invention. A position of the imaging information calculation section 74 (a light entrance of the imaging information calculation section 74) in the controller 7 is not necessarily located at the front surface of the housing 71, and may be located at any other surface as long as light can be obtained from an outside of the housing 71.

The above description is exemplified by a case where the present invention is applied to the stationary game apparatus body 5 which performs processing in accordance with an operation performed with the controller 7. However, the present invention may be applicable to a hand-held game apparatus. For example, the above-described display control processing is executed in accordance with an operation performed by using operation buttons provided on the hand-held game apparatus body. In this manner, the present invention is applied to the hand-held game apparatus and the like, whereby the display control processing of the present invention can be realized by using the hand-held game apparatus.

The above description is exemplified by a case where the present invention is applied to the stationary and hand-held game apparatuses. However, the present invention may be applicable to an information processing apparatus such as a general personal computer and a portable information processing apparatus which are each operated by an input device. As the portable information processing apparatus, devices such as a general personal computer, a mobile phone, and a PDA (Personal Digital Assistant) are adoptable. Further, the present invention may be applicable to the display control of the broadcast listing displayed on a broadcasting receiver such as a television receiver, a DVD (Digital Versatile Disc), a video recorder.

Further, the display control program of the present invention is not only previously stored in the involatile storage apparatus in the game apparatus body 5, but may be provided to the game apparatus body 5 via an external storage medium such as the optical disc 4. As the information storage medium storing the display control program, involatile semiconductor memory may be applicable in addition to a CD-ROM, a DVD and any other optical disc storage media. Alternatively, the display control program may be provided to the game apparatus body 5 via a wired or wireless communication line.

The storage medium having stored thereon the display control program and the display control apparatus according to the present invention are capable of allowing the user to understand information easily at the time of the scroll operation and also capable of improving viewability of the display information, and accordingly, are useful as an apparatus and a program for displaying predetermined characters in a plurality of drawing area.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium comprising a display control program executed by a computer of an apparatus for drawing predetermined character strings in a plurality of drawing areas and arranging and displaying the plurality of drawing areas in the form of a table, the table having at least a first axis representing time, the display control program causing the computer to:
   acquire operation data of a user;
   cause a display range of the table displayed on a display apparatus, including the first axis representing time, to be moved in accordance with the operation data;
   determine whether or not a drawing start point for drawing each of the character strings in each of the drawing areas stays within the display range;
   change, in the case where it is determined that the drawing start point of a drawing area, among the drawing areas, falls outside the display range, the drawing start point of the drawing area to a position which is in the drawing area and also which stays within the display range;
   arrange each of the character strings into each of the drawing areas from the drawing start point which is set to each of the drawing areas; and
   cause the table within the display range to be displayed on the display apparatus together with the arranged character strings.

2. The non-transitory computer-readable storage medium having stored thereon the display control program according to claim 1, wherein
   with respect to a drawing area, among the drawing areas, where a portion of the drawing area stays within the display range, and a remaining portion of the drawing area falls outside the display range, it is determined whether or not the drawing start point of the drawing area stays within the display range.

3. The non-transitory computer-readable storage medium having stored thereon the display control program according to claim 1, wherein
   the display range is caused to be moved by a distance shorter than a length of the drawing area in a scrolling direction at an interval of a unit time, and
   it is determined whether or not the drawing start point stays within the display range each time the display range is caused to be moved.

4. The non-transitory computer-readable storage medium having stored thereon the display control program according to claim 1, the display control program further causing the computer to:
   calculate an amount of scrolling in accordance with an operation content indicated by the operation data, wherein
   a scroll speed, which indicates an amount of scrolling per unit time, at an interval of the unit time, is calculated in accordance with the operation content indicated by the operation data, and
   the display range is caused to be moved in the table at the interval of the unit time in accordance with the scroll speed.

5. The non-transitory computer-readable storage medium having stored thereon the display control program according to claim 1, the display control program further causing the computer to:
   in the case where a portion of a drawing area, among the drawing areas, stays within the display range and a remaining portion of the drawing area falls outside the display range, expand/reduce the drawing area so as to limit the drawing area to the portion thereof which stays within the display range;
   determine, in the case where the drawing area is expanded/reduced, whether or not a character size of a character string to be drawn in the drawing area is changed; and
   change the character size to be drawn in the drawing area in the case where it is determined to change the character size to be drawn in the drawing area, wherein
   the character string is arranged in the drawing area from the drawing start point of the drawing area in the changed character size to be drawn in the drawing area.

6. The non-transitory computer-readable storage medium having stored thereon the display control program according to claim 5, the display control program further causing the computer to:
   calculate the number of characters arrangeable in the drawing area in accordance with a size of the drawing area; and
   determine whether or not the character size of the character string to be drawn in the drawing area is to be changed in accordance with whether or not the calculated number of characters arrangeable in the drawing area is equal to or more than a predetermined number, wherein
   the character size is changed to a relatively larger size in the case where the number of characters arrangeable in the drawing area is determined to be equal to or more than the predetermined number, whereas the character size is changed to a relatively smaller size in the case where the number of characters arrangeable in the drawing area is determined to be less than the predetermined number.

7. The non-transitory computer-readable storage medium having stored thereon the display control program according to claim 6, wherein in the case where the number of characters arrangeable in the drawing area is determined to be less than the predetermined number, the character size to be arranged in the drawing area is reduced by one level, when the character size is reduced, the number of characters arrangeable in the drawing area is recalculated in accordance with the size of the drawing area with respect to which the character size has been reduced and in accordance with the reduced character size, and in accordance with the reduction in the character size, it is determined whether or not the recalculated number of characters is equal to or more than the predetermined number.

8. The non-transitory computer-readable storage medium having stored thereon the display control program according to claim 6, the display control program further causing the computer to:

calculate the number of character lines arrangeable in the drawing area in accordance with a length of one side of the drawing area and in accordance with a length of a character in a direction of the one side, the character having a character size to be arranged in the drawing area; and calculate the number of characters arrangeable in each of the character lines in the drawing area in accordance with a length of the other side of the drawing area and in accordance with a length of the character in a direction of the other side, the character having the character size to be arranged in the drawing area, wherein the number of characters arrangeable in the drawing area is calculated by using the number of character lines and the number of characters arrangeable in each of the character lines, and the character string is arranged in the drawing area from the drawing start point of the drawing area in accordance with the changed character size with respect to the drawing area by using the number of character lines.

9. The non-transitory computer-readable storage medium having stored thereon the display control program according to claim 7, wherein in the case where it is determined that the number of characters arrangeable in the drawing area is less than the predetermined number under a circumstance where the character size has been reduced to a minimum size, the drawing area is left blank.

10. The non-transitory computer-readable storage medium having stored thereon the display control program according to claim 1, wherein the table is a broadcast listing in which the plurality of drawing areas is arranged in a matrix form, and in which the first axis thereof represents a time axis and a second axis represents a broadcast station axis, and each of the character strings at least indicative of a broadcast title is arranged into each of the plurality of the drawing areas in accordance with a broadcast station and a broadcast time of the broadcast.

11. The non-transitory computer-readable storage medium having stored thereon the display control program according to claim 1, wherein the display range is scrolled continuously in accordance with the operation data.

12. The non-transitory computer-readable storage medium having stored thereon the display control program according to claim 1, wherein the display range is scrolled smoothly in accordance with the operation data.

13. The non-transitory computer-readable storage medium having stored thereon the display control program according to claim 1, wherein each time it is determined that the drawing start point falls outside the display range, the drawing start point is changed.

14. The non-transitory computer-readable storage medium having stored thereon the display control program according to claim 1, wherein the plurality of drawing areas are configured to have sizes that are different from each other.

15. A display control apparatus for drawing predetermined character strings in a plurality of drawing areas and for arranging and displaying the plurality of drawing areas in the form of a table, the table having at least a first axis representing time, the display control apparatus comprising at least one processor, the at least one processor controlling the apparatus to:

acquire operation data of a user;

cause a display range of the table displayed on a display apparatus, including the first axis representing time, to be moved in accordance with the operation data;

determine whether or not a drawing start point for drawing each of the character strings in each of the drawing areas stays within the display range;

change, in the case where the drawing start point of a drawing area, among the drawing areas, falls outside the display range, the drawing start point of the drawing area to a position which is in the drawing area and also which stays within the display range;

arrange each of the character strings into each of the drawing areas from the drawing start point which is set to each of the drawing areas; and cause the table within the display range to be displayed on the display apparatus together with the arranged character strings.

16. A display control system for drawing predetermined character strings in a plurality of drawing areas and for arranging and displaying the plurality of drawing areas in the form of a table, the table having at least a first axis representing time, the display control system comprising:

a processing system having at least one processor, the processing system configured to:

acquire operation data of a user, cause a display range of the table displayed on a display apparatus, including the first axis representing time, to be moved in accordance with the acquired operation data, determine whether or not a drawing start point for drawing each of the character strings in each of the drawing areas stays within the display range, change, in the case where the drawing start point of a drawing area, among the drawing areas, falls outside the display range, the drawing start point of the drawing area to a position which is in the drawing area and also which stays within the display range, arrange each of the character strings into each of the drawing areas from the drawing start point which is set to each of the drawing areas, and cause the table within the display range to be displayed on the display apparatus together with the arranged character strings.

17. A display control method performed by a display control system configured to draw predetermined character strings in a plurality of drawing areas and configured to arrange and display the plurality of drawing areas in the form of a table, the table having at least a first axis representing time, the display control method comprising:

acquiring operation data of a user;

causing a display range of the table displayed on a display apparatus, including the first axis representing time, to be moved in accordance with the operation data;

determining whether or not a drawing start point for drawing each of the character strings in each of the drawing areas stays within the display range;

changing, in the case where it is determined that the drawing start point of a drawing area, among the drawing areas, falls outside the display range, the drawing start point of the drawing area to a position which is in the drawing area and also which stays within the display range;

arranging each of the character strings into each of the drawing areas from the drawing start point which is set to each of the drawing areas; and causing the table within the display range to be displayed on the display apparatus together with the arranged character strings.

* * * * *